US009978682B1

(12) United States Patent
Correale, Jr. et al.

(10) Patent No.: US 9,978,682 B1
(45) Date of Patent: May 22, 2018

(54) COMPLEMENTARY METAL OXIDE SEMICONDUCTOR (CMOS) STANDARD CELL CIRCUITS EMPLOYING METAL LINES IN A FIRST METAL LAYER USED FOR ROUTING, AND RELATED METHODS

(71) Applicant: QUALCOMM Incorporated, San Diego, CA (US)

(72) Inventors: Anthony Correale, Jr., Raleigh, NC (US); William Goodall, III, Cary, NC (US); Philip Michael Iles, Durham, NC (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 15/487,222

(22) Filed: Apr. 13, 2017

(51) Int. Cl.
| H01L 23/522 | (2006.01) |
| H01L 23/528 | (2006.01) |
| H01L 21/8238 | (2006.01) |
| H01L 27/02 | (2006.01) |
| G06F 17/50 | (2006.01) |
| H01L 27/092 | (2006.01) |

(52) U.S. Cl.
CPC ........ *H01L 23/528* (2013.01); *G06F 17/5072* (2013.01); *G06F 17/5081* (2013.01); *H01L 21/823871* (2013.01); *H01L 23/5226* (2013.01); *H01L 27/0207* (2013.01); *H01L 27/092* (2013.01); *G06F 2217/78* (2013.01)

(58) Field of Classification Search
CPC ............... H01L 23/528; H01L 23/5226; H01L 21/823871; H01L 27/0207; H01L 27/092; G06F 17/5072; G06F 17/5081
See application file for complete search history.

(56) References Cited

U.S. PATENT DOCUMENTS

| 6,617,621 B1 * | 9/2003 | Gheewala ......... H01L 27/11807 257/203 |
| 7,219,324 B1 * | 5/2007 | Sherlekar ............ G06F 17/5077 257/207 |
| 7,475,375 B2 | 1/2009 | Nakanishi |
| 8,173,491 B2 | 5/2012 | Law et al. |
| 9,070,552 B1 * | 6/2015 | Shah ................... H01L 27/0207 |
| 9,305,633 B2 * | 4/2016 | Grover ................. G11C 11/412 |
| 9,461,065 B1 | 10/2016 | Haigh |
| 9,514,264 B1 * | 12/2016 | Nebesnyi .............. G06F 17/505 |
| 9,529,954 B1 * | 12/2016 | Haigh ................. G06F 17/5068 |

(Continued)

*Primary Examiner* — Evan Pert
(74) *Attorney, Agent, or Firm* — W&T/Qualcomm

(57) ABSTRACT

Complementary metal oxide semiconductor (MOS) (CMOS) standard cell circuits employing metal lines in a first metal layer used for routing, and related methods are disclosed. In one aspect, a CMOS standard cell circuit includes first supply rail, second supply rail, and metal lines disposed in the first metal layer. One or more of the metal lines are dynamically cut corresponding to a first cell boundary and a second cell boundary of the CMOS standard cell such that the metal lines have cut edges corresponding to the first and second cell boundaries. Metal lines not cut corresponding to the first and second cell boundaries can be used to interconnect nodes of the CMOS standard cell circuit. Dynamically cutting the metal lines allows the first metal layer to be used for routing, reducing routing in other metal layers such that fewer vias and metal lines are disposed above the first metal layer.

20 Claims, 13 Drawing Sheets

(56) References Cited

U.S. PATENT DOCUMENTS

| | | | |
|---|---|---|---|
| 9,563,733 B2* | 2/2017 | Becker | G06F 17/5072 |
| 9,627,370 B1* | 4/2017 | Lam | H01L 29/0649 |
| 9,704,845 B2* | 7/2017 | Smayling | H01L 27/0207 |
| 9,818,651 B2* | 11/2017 | Bouche | H01L 21/82387 |
| 2002/0014899 A1* | 2/2002 | Sasaki | H01L 27/0207 326/101 |
| 2006/0131609 A1* | 6/2006 | Kinoshita | G06F 17/5068 257/202 |
| 2006/0186478 A1* | 8/2006 | Hughes | H01L 27/0207 257/368 |
| 2006/0190893 A1* | 8/2006 | Morton | G06F 17/5068 257/773 |
| 2007/0002617 A1* | 1/2007 | Houston | G11C 11/412 365/185.07 |
| 2010/0155783 A1* | 6/2010 | Law | H01L 27/0207 257/206 |
| 2011/0006439 A1* | 1/2011 | Ichiryu | H01L 23/5226 257/774 |
| 2015/0333008 A1 | 11/2015 | Gupta et al. | |
| 2016/0063166 A1 | 3/2016 | Hsieh et al. | |
| 2017/0316140 A1* | 11/2017 | Kim | G06F 17/5072 |
| 2017/0317063 A1* | 11/2017 | Chang | G06F 17/5072 |
| 2017/0358565 A1* | 12/2017 | Hensel | H01L 27/0207 |

* cited by examiner

COMPLEMENTARY METAL OXIDE SEMICONDUCTOR (CMOS) STANDARD CELL CIRCUITS EMPLOYING METAL LINES IN A FIRST METAL LAYER USED FOR ROUTING, AND RELATED METHODS

BACKGROUND

I. Field of the Disclosure

The technology of the disclosure relates generally to complementary metal oxide semiconductor (MOS) (CMOS) standard cell circuits, and more particularly to fabrication of CMOS standard cell circuits having increased performance and reduced power consumption.

II. Background

Processor-based computer systems can include a vast array of integrated circuits (ICs). Each IC has a complex layout design comprised of multiple IC devices. Complementary metal oxide semiconductor (MOS) (CMOS) standard cell circuits are often employed to assist in making the design of ICs less complex and more manageable. In particular, CMOS standard cell circuits provide a designer with pre-designed cells corresponding to commonly used IC devices that conform to specific design rules of a chosen technology. As non-limiting examples, CMOS standard cell circuits (i.e., standard cell circuits that include both a P-type dopant and an N-type dopant semiconductor material diffusion region to form both P-type MOS (PMOS) and N-type MOS (NMOS) devices) may include gates, inverters, multiplexers, and adders. Using CMOS standard cell circuits enables a designer to create ICs having consistent layout designs, thereby creating a more uniform and less complex layout design across multiple ICs, as compared to custom-designing each circuit.

Conventional CMOS standard cell circuits are fabricated using process technologies that form device elements with a pre-defined technology node size. For example, a process technology may be employed to fabricate a conventional CMOS standard cell circuit with device elements that are ten (10) nanometers (nm) or seven (7) nm wide. CMOS standard cell circuits designed with technology node sizes of ten (10) nm and below conventionally employ a local interconnect wiring layer to afford connections between multiple device nodes to cause the CMOS standard cell circuit to achieve a particular function. For example, a CMOS standard cell circuit may employ a metal zero layer (M0) as a local interconnect wiring layer to interconnect a source, drain, and/or gate of a transistor to other device nodes in the CMOS standard cell circuit using vertical interconnect accesses (vias) and wiring in additional metal layers, such as a metal one layer (M1) and metal two layer (M2).

As technology nodes and other lithographic features continue to decrease in size, a higher number of devices, such as transistors, can be fabricated in less area within a die. While CMOS standard cell circuits can be designed with a higher device density, design rules of a given fabrication technology, such as spacing between particular nodes, need to be satisfied to ensure that CMOS standard cell circuits function as intended. For example, one technique to achieve higher device density while meeting design rules related to element spacing involves printing individual shapes of an interconnect wiring layer (e.g., M0), and cutting the interconnect wiring layer into multiple sections (i.e., multiple wires). Cutting the interconnect wiring layer (M0) in this manner results in multiple wires separated by the width of the corresponding cut, wherein such separation is smaller compared to the separation achievable by printing separate wires in the interconnect wiring layer. Thus, adjacent CMOS standard cells in a CMOS standard cell circuit may be placed closer in proximity using the print and cut method described above.

However, printing and cutting shapes in the interconnect wiring layer (M0) in multiple CMOS standard cells as described above results in additional vias and wires in metal layers other than the interconnect wiring layer to interconnect device nodes of multiple CMOS standard cells. The capacitance of such vias and wires increases the switching power of the CMOS standard cell circuit, thus increasing the corresponding power consumption. Additionally, the resistance of such vias combined with the increased resistance and capacitance of the additional metal wiring increases the delay of the CMOS standard cell circuit, which reduces the corresponding performance.

SUMMARY OF THE DISCLOSURE

Aspects disclosed in the detailed description include complementary metal oxide semiconductor (MOS) (CMOS) standard cell circuits employing metal lines in a first metal layer used for routing, and related methods. In one aspect, a CMOS standard cell circuit includes a first supply rail (e.g., a voltage rail) and a second supply rail (e.g., a ground rail) disposed in the first metal layer. Additionally, the CMOS standard cell circuit includes metal lines disposed in the first metal layer. The voltage rail and the ground rail are not cut during fabrication such that the voltage and ground rails can be shared by adjacent CMOS standard cells in a corresponding CMOS standard cell circuit. One or more of the metal lines are dynamically cut during fabrication such that the metal lines have cut edges corresponding to first and second cell boundaries of the corresponding CMOS standard cell. Further, one or more metal lines are not cut corresponding to the first and/or second cell boundaries (i.e., have an uncut edge corresponding to at least one of the first and second cell boundaries), wherein such metal lines can be used to interconnect nodes of the CMOS standard cell to nodes in adjacent CMOS standard cells. In this manner, the metal lines are dynamically cut such that the corresponding CMOS standard cell circuit can achieve a desired figure of merit (FOM) by using the metal lines in the first metal layer to interconnect nodes in an adjacent CMOS standard cell circuit. In other words, dynamically cutting the metal lines in the first metal layer allows the first metal layer to be used for routing in the CMOS standard cell circuit, which reduces the amount of routing in other metal layers such that fewer vertical interconnect accesses (vias) and metal lines are disposed above the first metal layer. The reduced number of vias and metal lines disposed above the first metal layer reduces the resistance and capacitance of the CMOS standard cell circuit compared to conventional CMOS standard cell circuits, which results in increased performance and reduced power consumption.

In this regard in one aspect, a CMOS standard cell is provided. The CMOS standard cell comprises a first supply rail disposed in a direction in a first metal layer, a second supply rail disposed in the direction in the first metal layer, and a plurality of metal lines disposed in the direction in the first metal layer. Each metal line of the plurality of metal lines corresponds to a track of a plurality of tracks. One or more metal lines of the plurality of metal lines have a cut edge corresponding to a first cell boundary of the CMOS standard cell. One or more metal lines of the plurality of metal lines have a cut edge corresponding to a second cell boundary of the CMOS standard cell, wherein the second cell boundary is on an opposite side of the CMOS standard cell compared to the first cell boundary. One or more metal lines of the plurality of metal lines have an uncut edge corresponding to at least one of the first cell boundary and the second cell boundary.

In another aspect, a CMOS standard cell circuit is provided. The CMOS standard cell circuit comprises a plurality of CMOS standard cells. Each CMOS standard cell comprises a first supply rail disposed in a direction in a first metal layer, a second supply rail disposed in the direction in the first metal layer, and a plurality of metal lines disposed in the direction in the first metal layer. Each metal line of the plurality of metal lines corresponds to a track of a plurality of tracks. One or more metal lines of the plurality of metal lines have a cut edge corresponding to a first cell boundary of a corresponding CMOS standard cell. One or more metal lines of the plurality of metal lines have a cut edge corresponding to a second cell boundary of the corresponding CMOS standard cell, wherein the second cell boundary is on an opposite side of the corresponding CMOS standard cell compared to the first cell boundary. One or more metal lines of the plurality of metal lines have an uncut edge corresponding to at least one of the first cell boundary and the second cell boundary. One or more CMOS standard cells of the plurality of CMOS standard cells are disposed such that the second cell boundary of the one or more CMOS standard cells is substantially adjacent to a first cell boundary of one or more other CMOS standard cells. One or more metal lines of two or more CMOS standard cells form a single continuous metal line across corresponding tracks of the two or more CMOS standard cells.

In another aspect, a method for fabricating a CMOS standard cell circuit with dynamically cut metal lines in a first metal layer is provided. The method comprises determining placement of a plurality of metal lines and interconnects disposed above a first metal layer in one or more CMOS standard cells. The method also comprises determining if a first metal layer layout optimizer is available. The method also comprises, responsive to determining that the first metal layer layout optimizer is available, determining a layout of a plurality of instances of the one or more CMOS standard cells. Placement of the plurality of metal lines disposed in the first metal layer in the layout of each instance of the one or more CMOS standard cells is based on an optimized placement of the plurality of metal lines disposed in the first metal layer using orientation and adjacency variables of the one or more CMOS standard cells and a plurality of cell variation templates that define physical attributes of each layout. The method also comprises, responsive to determining that the first metal layer layout optimizer is not available, providing the layout of the plurality of instances of the one or more CMOS standard cells. Placement of the plurality of metal lines disposed in the first metal layer in the layout of each instance of the one or more CMOS standard cells corresponds to the placement of the plurality of metal lines disposed in the first metal layer in the plurality of cell variation templates. The method also comprises, for each layout of each instance of the plurality of instances of the one or more CMOS standard cells, determining a plurality of corresponding design costs. The method also comprises building one or more first metal layer cost-based trees based on one or more corresponding variation seeds. Each first metal layer cost-based tree comprises the plurality of design costs corresponding to a combination of the layouts of the one or more CMOS standard cells associated with the corresponding variation seed. The method also comprises determining the first metal layer cost-based tree that includes the plurality of design costs corresponding to a figure of merit. The method also comprises disposing and cutting the plurality of metal lines in the first metal layer according to the layout of each of the one or more CMOS standard cells of the determined first metal layer cost-based tree.

In another aspect, a non-transitory computer-readable medium having stored thereon computer data which, when used by a fabrication system, allows the fabrication system to fabricate a CMOS standard cell circuit is provided. The CMOS standard cell circuit comprises a plurality of CMOS standard cells. Each CMOS standard cell comprises a first supply rail disposed in a direction in a first metal layer, a second supply rail disposed in the direction in the first metal layer, and a plurality of metal lines disposed in the direction in the first metal layer. Each metal line of the plurality of metal lines corresponds to a track of a plurality of tracks. One or more metal lines of the plurality of metal lines have a cut edge corresponding to a first cell boundary of a corresponding CMOS standard cell. One or more metal lines of the plurality of metal lines have a cut edge corresponding to a second cell boundary of the corresponding CMOS standard cell, wherein the second cell boundary is on an opposite side of the corresponding CMOS standard cell compared to the first cell boundary. One or more metal lines of the plurality of metal lines have an uncut edge corresponding to at least one of the first cell boundary and the second cell boundary. One or more CMOS standard cells of the plurality of CMOS standard cells are disposed such that the second cell boundary of the one or more CMOS standard cells is substantially adjacent to a first cell boundary of one or more other CMOS standard cells. One or more metal lines of two or more CMOS standard cells form a single continuous metal line across corresponding tracks of the two or more CMOS standard cells.

DETAILED DESCRIPTION

Figure 1:
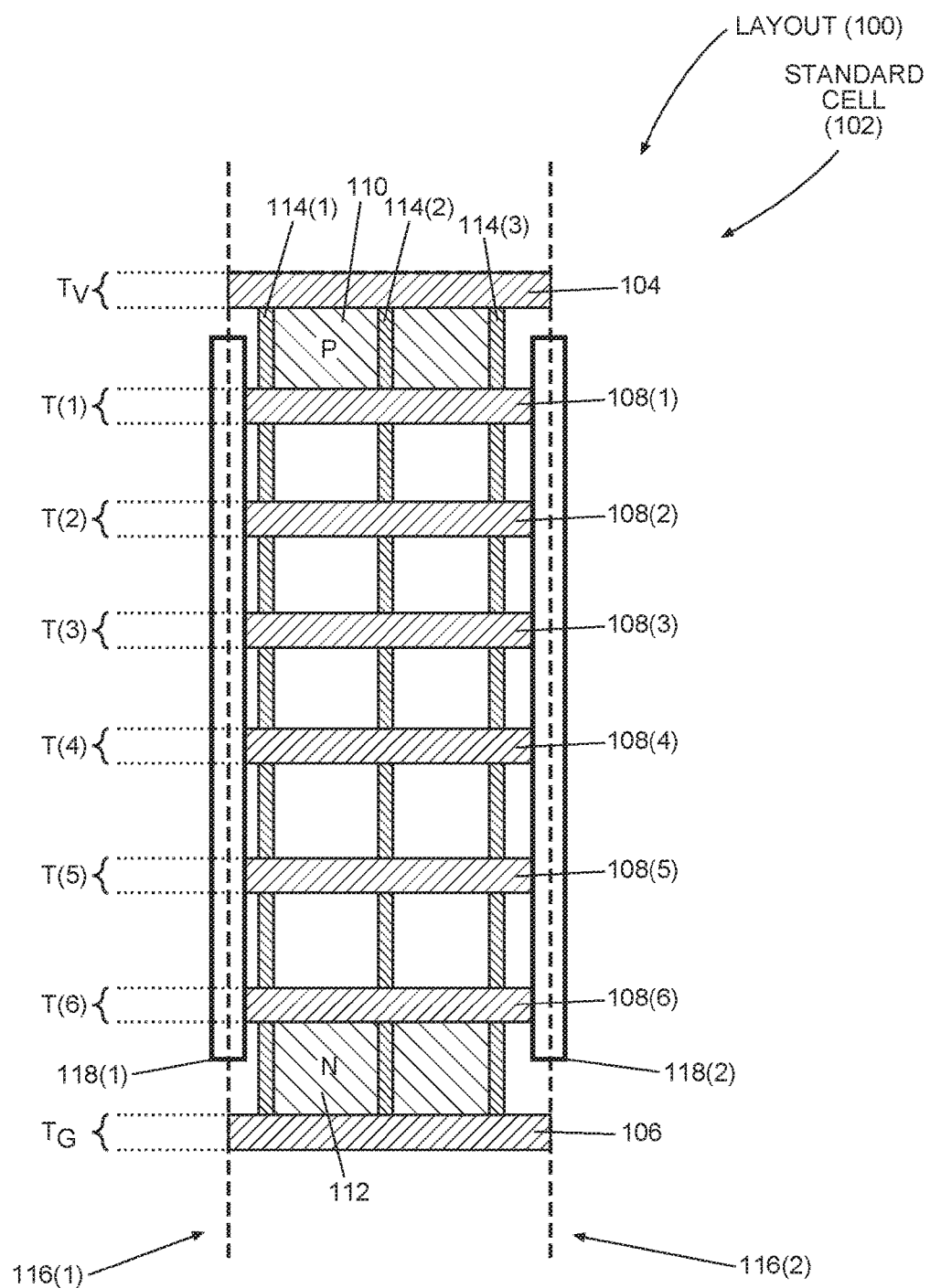
FIG. 1 is a top-view diagram of an exemplary layout of an exemplary conventional complementary metal oxide semiconductor (MOS) (CMOS) standard cell fabricated with a conventional process that cuts all metal lines in a first metal layer at a first cell boundary and a second cell boundary of the conventional CMOS standard cell.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects. Additionally, although power and ground connections are not illustrated in the drawing figures, any aspect described herein employs any power and ground connections necessary for operation as understood by a person of ordinary skill in the art.

Figure 3:
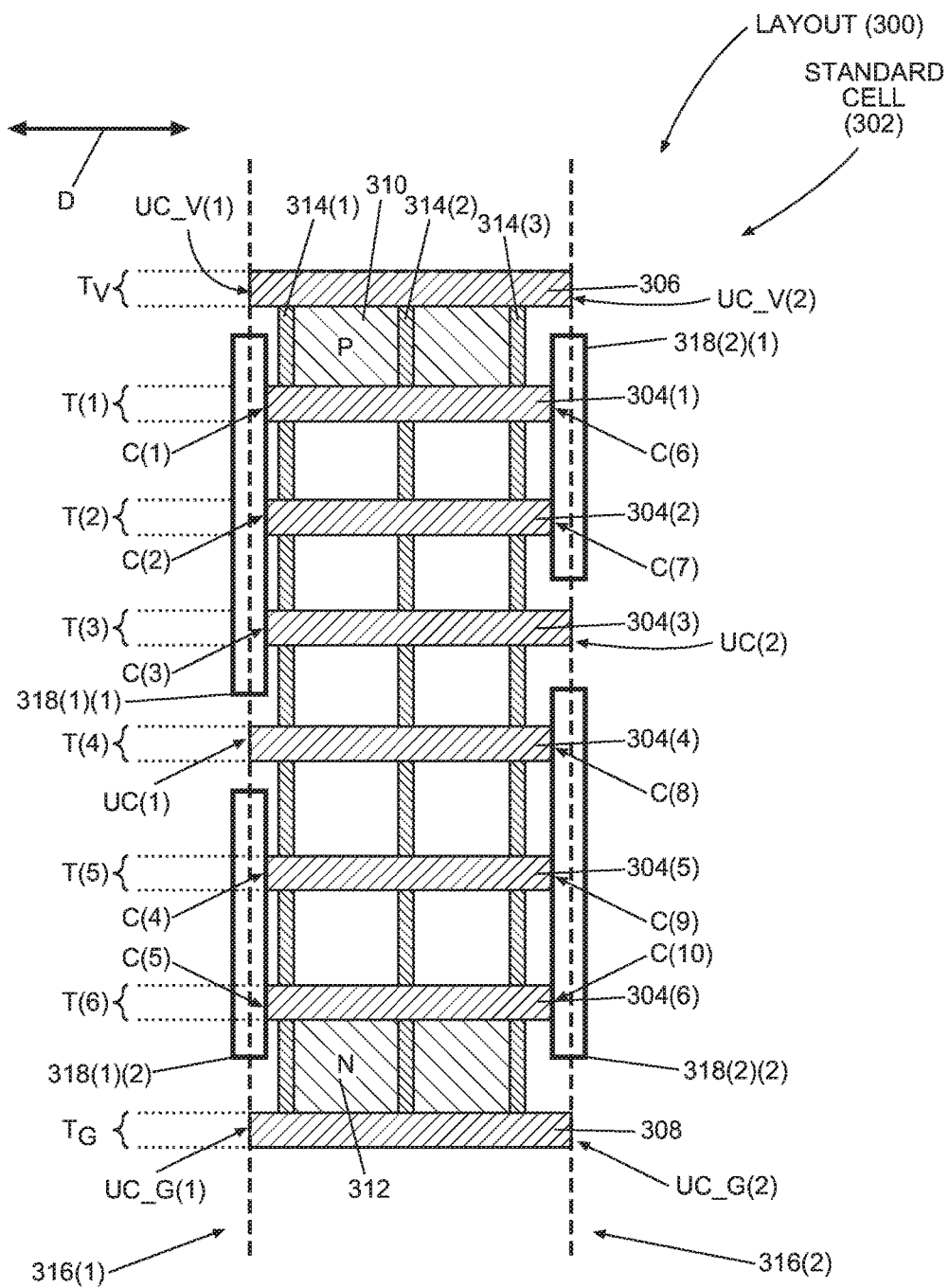
FIG. 3 is a top-view diagram of an exemplary layout of an exemplary CMOS standard cell employing metal lines in a first metal layer used for routing so as to increase performance and reduce power consumption.

Before discussing the details of an exemplary complementary metal oxide semiconductor (MOS) (CMOS) standard cell (i.e., a standard cell that includes both a P-type dopant and an N-type dopant semiconductor material diffusion region to form both P-type MOS (PMOS) and N-type MOS (NMOS) devices) employing metal lines in a first metal layer used for routing starting in FIG. 3, an exemplary conventional CMOS standard cell fabricated with a conventional process that does not use metal lines in a first metal layer for routing is first described.

In this regard, FIG. 1 is a top-view diagram of an exemplary layout 100 of an exemplary conventional CMOS standard cell 102. In particular, the CMOS standard cell 102 includes a first supply rail 104 (e.g., a voltage rail 104) and a second supply rail 106 (e.g., a ground rail 106) disposed in a first metal layer. The voltage rail 104 corresponds to a voltage track $T_V$ and the ground rail 106 corresponds to a ground track $T_G$. Additionally, metal lines 108(1)-108(6) used to interconnect nodes within the CMOS standard cell 102 are disposed in the first metal layer, wherein each metal line 108(1)-108(6) corresponds to a track T(1)-T(6). Although the metal lines 108(1)-108(6) are disposed between the voltage rail 104 and ground rail 106 in this example, other examples may include the voltage rail 104 and the ground rail 106 disposed between the metal lines 108(1)-108(6). The CMOS standard cell 102 also includes a P-type dopant semiconductor material diffusion region (P region) 110, an N-type dopant semiconductor material diffusion region (N region) 112, and gates 114(1)-114(3) used to form one or more transistors in the CMOS standard cell 102. As a non-limiting example, the first metal layer may be a metal zero layer (e.g., M0) such that the voltage rail 104, ground rail 106, and metal lines 108(1)-108(6) are disposed above the P region 110, N region 112, and gates 114(1)-114(3).

With continuing reference to FIG. 1, the metal lines 108(1)-108(6) are cut corresponding to a first cell boundary 116(1) and a second cell boundary 116(2) of the CMOS standard cell 102 such that the metal lines 108(1)-108(6) do not electrically couple to metal lines on the first metal layer in adjacent CMOS standard cells when disposed in a CMOS standard cell circuit. More specifically, the conventional process used to fabricate the CMOS standard cell 102 employs cut masks 118(1), 118(2) to cut the metal lines 108(1)-108(6) corresponding to the first and second cell boundaries 116(1), 116(2), respectively. The cut masks 118(1), 118(2) are not used to cut the voltage and ground rails 104, 106 such that the voltage and ground rails 104, 106 can be shared by adjacent CMOS standard cells in the corresponding CMOS standard cell circuit. The cut masks 118(1), 118(2) in this example can be either single or multi-patterned. For example, in a single-patterned process, one cut mask (e.g., cut mask 118(1)) corresponds to the first cell boundary 116(1), and one cut mask (e.g., cut mask 118(2)) corresponds to the second cell boundary 116(2). In this manner, a single-patterned process limits the vertical separation between individual cut masks thereby limiting which metal lines 108(1)-108(6) may be cut. In a multi-patterned process, multiple cut masks (e.g., cut mask 118(1) divided into multiple cut masks) correspond to the first cell boundary 116(1), and multiple cut masks (e.g., cut mask 118(2) divided into multiple cut masks) correspond to the second cell boundary 116(2). In this manner, a multi-patterned process reduces the vertical space between cut masks and reduces or eliminates the limitations of which metal lines 108(1)-108(6) may be cut. For example, if the metal lines 108(1)-108(6) are dual-patterned, the odd numbered tracks 108(1), 108(3), and 108(5) would have a different cut mask than the even numbered tracks 108(2), 108(4) and 108(6). Cutting the metal lines 108(1)-108(6) allows the CMOS standard cell 102 to have less separation from adjacent CMOS standard cells compared to the separation achievable by printing the metal lines 108(1)-108(6) in the first metal layer for each corresponding CMOS standard cell. However, statically cutting the metal lines 108(1)-108(6) at the first and second cell boundaries 116(1), 116(2) limits the metal lines 108(1)-108(6) to interconnecting nodes internal to the CMOS standard cell 102.

Figure 2:
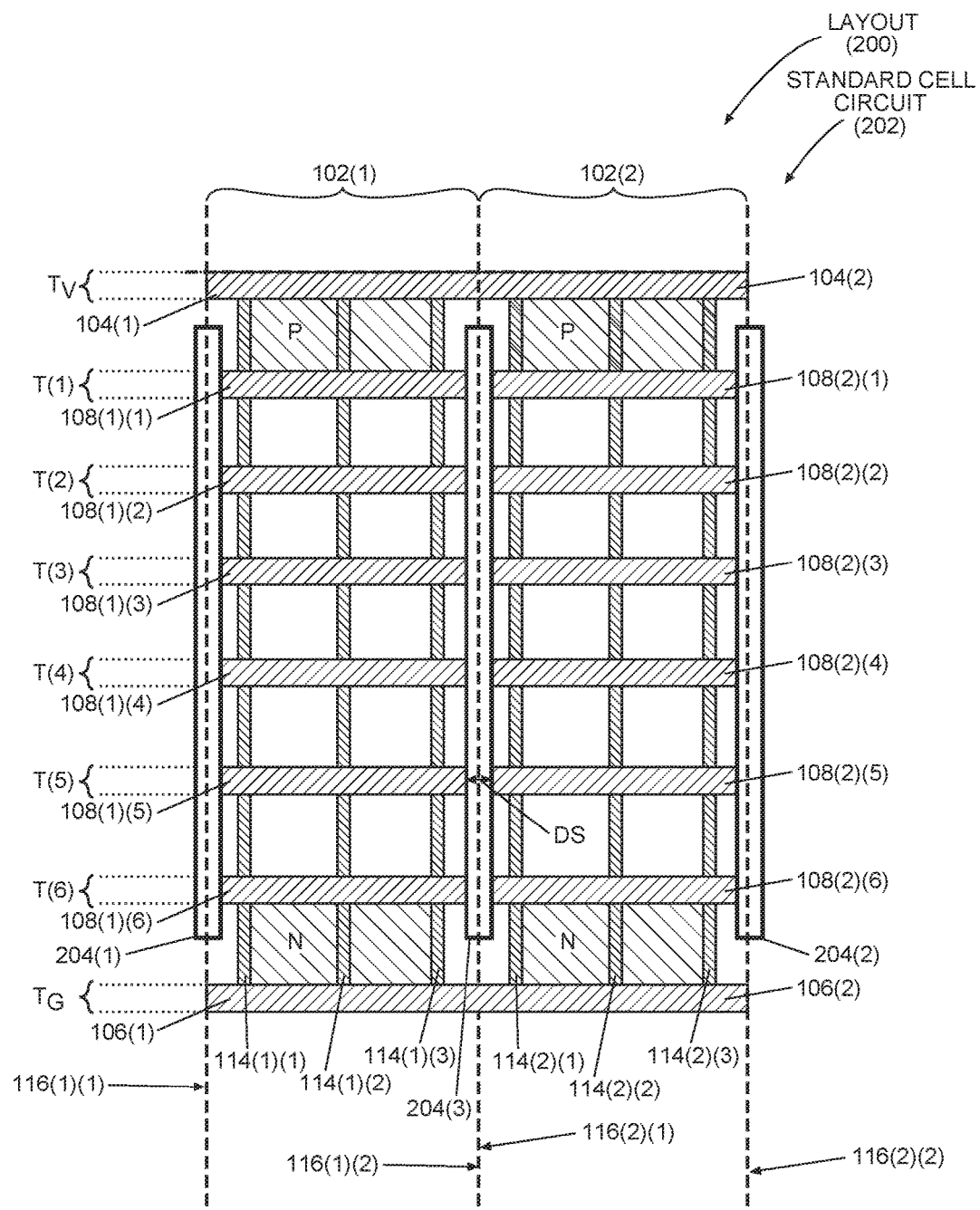
FIG. 2 is a top-view diagram of an exemplary layout of an exemplary conventional CMOS standard cell circuit formed from two (2) instances of the conventional CMOS standard cell of FIG. 1, wherein the metal lines in the first metal layer of each conventional CMOS standard cell are cut such that the metal lines of each CMOS standard cell do not cross the boundaries of the corresponding CMOS standard cell.

In this regard, FIG. 2 is a top-view diagram of an exemplary layout 200 of an exemplary conventional CMOS standard cell circuit 202 (i.e., a standard cell circuit that includes both a P-type dopant and an N-type dopant semiconductor material diffusion region to form both PMOS and NMOS devices) formed using two (2) instances of the conventional CMOS standard cell 102 of FIG. 1, referred to herein as CMOS standard cells 102(1), 102(2). Each CMOS standard cell 102(1), 102(2) includes certain common components with the CMOS standard cell 102 of FIG. 1 as shown by common element numbers between FIGS. 1 and 2, and thus will not be re-described herein.

With continuing reference to FIG. 2, the CMOS standard cell 102(1) includes a first supply rail 104(1) (e.g., a voltage rail 104(1)), a second supply rail 106(1) (e.g., a ground rail 106(1)), and metal lines 108(1)(1)-108(1)(6) disposed in the first metal layer. The CMOS standard cell 102(1) also includes gates 114(1)(1)-114(1)(3). Similarly, the CMOS standard cell 102(2) includes a first supply rail 104(2) (e.g., a voltage rail 104(2)), a second supply rail 106(2) (e.g., a ground rail 106(2)), and metal lines 108(2)(1)-108(2)(6) disposed in the first metal layer. The CMOS standard cell 102(2) also includes gates 114(2)(1)-114(2)(3). The voltage rails 104(1), 104(2) are formed using a single metal line corresponding to the voltage track $T_V$ such that a supply voltage may be shared between the CMOS standard cells 102(1), 102(2). The ground rails 106(1), 106(2) are also formed using a single metal line corresponding to the ground track $T_G$ such that the CMOS standard cells 102(1), 102(2) may share a ground voltage source. Additionally, each of the corresponding metal lines 108(1)(1)-108(1)(6), 108(2)(1)-108(2)(6) are originally formed using a single metal line corresponding to each track T(1)-T(6). However, a cut mask 204(1) is used to cut the metal lines 108(1)(1)-108(1)(6) corresponding to a first cell boundary 116(1)(1) of the CMOS standard cell 102(1), and a cut mask 204(2) is used to cut the metal lines 108(2)(1)-108(2)(6) corresponding to a second cell boundary 116(2)(2) of the CMOS standard cell 102(2). Further, a cut mask 204(3) is disposed corresponding to a second cell boundary 116(1)(2) of the CMOS standard cell 102(1) and corresponding to a first cell boundary 116(2)(1) of the CMOS standard cell 102(2) such that each single metal line corresponding to the tracks T(1)-T(6) is cut to create a distance DS between the metal lines 108(1)(1)-108(1)(6) and the corresponding metal lines 108(2)(1)-108(2)(6).

With continuing reference to FIG. 2, the metal lines 108(1)(1)-108(1)(6) are limited to interconnecting nodes within the CMOS standard cell 102(1), and the metal lines 108(2)(1)-108(2)(6) are limited to interconnecting nodes within the CMOS standard cell 102(2). Thus, to interconnect nodes of the CMOS standard cell 102(1) with nodes of the CMOS standard cell 102(2), the CMOS standard cell circuit 202 must employ vertical interconnect accesses (vias) and metal lines in metal layers in addition to the first metal layer. For example, if the first metal layer is M0, additional metal lines in a metal one layer (M1) and a metal two layer (M2) can be used to interconnect nodes between the CMOS standard cells 102(1), 102(2), wherein vias are used to interconnect metal lines between M0, M1, and M2. However, the capacitance of such vias and metal lines in M1 and M2 increases the switching power of the CMOS standard cell circuit 202, thus increasing the corresponding power consumption. Further, the resistance of such vias combined with the increased resistance and capacitance of the additional metal lines in M1 and M2 increases the delay of the CMOS standard cell circuit 202, which reduces the corresponding performance.

In this regard, FIG. 3 is a top-view diagram of an exemplary layout 300 of an exemplary CMOS standard cell 302 employing metal lines 304(1)-304(6) in a first metal layer used for routing so as to increase performance and reduce power consumption. In particular, the CMOS standard cell 302 includes a first supply rail 306 (e.g., a voltage rail 306) and a second supply rail 308 (e.g., a ground rail 308) disposed in a direction D and in the first metal layer. The voltage rail 306 corresponds to a voltage track $T_V$, and the ground rail 308 corresponds to a ground track $T_G$. Additionally, the metal lines 304(1)-304(6) are disposed in the direction D and in the first metal layer, wherein each metal line 304(1)-304(6) corresponds to a track T(1)-T(6). Although the metal lines 304(1)-304(6) are disposed between the voltage rail 306 and ground rail 308 in this example, other examples may include the voltage rail 306 and the ground rail 308 disposed between the metal lines 304(1)-304(6). The CMOS standard cell 302 also includes a P region 310, an N region 312, and gates 314(1)-314(3) used to form one or more transistors in the CMOS standard cell 302. As a non-limiting example, the first metal layer may be M0 such that the voltage rail 306, ground rail 308, and metal lines 304(1)-304(6) are disposed above the P region 310, N region 312, and gates 314(1)-314(3).

With continuing reference to FIG. 3, similar to the CMOS standard cell 102 of FIG. 1, the voltage rail 306 and the ground rail 308 are not cut such that the voltage and ground rails 306, 308 can be shared by adjacent CMOS standard cells in the corresponding CMOS standard cell circuit. However, as discussed in more detail below, the metal lines 304(1)-304(6) in this aspect are dynamically cut rather than statically cut as in FIG. 1. For example, the metal lines 304(1)-304(3), 304(5), 304(6) are cut corresponding to a first cell boundary 316(1) of the CMOS standard cell 302 such that the metal lines 304(1)-304(3), 304(5), 304(6) have corresponding cut edges C(1)-C(5) corresponding to the first cell boundary 316(1). However, the metal line 304(4) is not cut corresponding to the first cell boundary 316(1) such that the metal line 304(4) has an uncut edge UC(1) corresponding to the first cell boundary 316(1). More specifically, the exemplary process used to fabricate the CMOS standard cell 302 employs a cut mask 318(1)(1) to cut the metal lines 304(1)-304(3) corresponding to the first cell boundary 316(1), and a cut mask 318(1)(2) to cut the metal lines 304(5), 304(6) corresponding to the first cell boundary 316(1) while leaving the metal line 304(4) uncut. Although the cut masks 318(1)(1), 318(1)(2) are each illustrated as a single shape, each cut mask 318(1)(1), 318(1)(2) may be employed using a number of masks according to the type of patterning process used (e.g., single patterning, double patterning, triple patterning, etc.). In this manner, the metal line 304(4) can be used to interconnect nodes of the CMOS standard cell 302 to nodes in a CMOS standard cell disposed adjacent to the first cell boundary 316(1). Further, the voltage and ground rails 306, 308 have respective uncut edges UC_V(1), UC_V(2) and UC_G(1), UC_G(2) corresponding to the first and second cell boundaries 316(1), 316(2), respectively, such that the voltage and ground rails 306, 308 can be shared with adjacent CMOS standard cells.

With continuing reference to FIG. 3, the metal lines 304(1), 304(2), 304(4)-304(6) are cut corresponding to a second cell boundary 316(2) of the CMOS standard cell 302 that is on an opposite side of the CMOS standard cell 302 compared to the first cell boundary 316(1). In this manner, the metal lines 304(1), 304(2), 304(4)-304(6) have corresponding cut edges C(6)-C(10) corresponding to the second cell boundary 316(2). However, the metal line 304(3) is not cut corresponding to the second cell boundary 316(2) such that the metal line 304(3) has an uncut edge UC(2) corresponding to the second cell boundary 316(2). In particular, the exemplary process used to fabricate the CMOS standard cell 302 employs a cut mask 318(2)(1) to cut the metal lines 304(1), 304(2) corresponding to the second cell boundary 316(2), and a cut mask 318(2)(2) to cut the metal lines 304(4)-304(6) corresponding to the second cell boundary 316(2) while leaving the metal line 304(3) uncut. Although the cut masks 318(2)(1), 318(2)(2) are each illustrated as a single shape, each cut mask 318(2)(1), 318(2)(2) may be employed using a number of masks according to the type of patterning process used (e.g., single patterning, double patterning, triple patterning, etc.). Thus, the metal line 304(3) can be used to interconnect nodes of the CMOS standard cell 302 to nodes in a CMOS standard cell disposed adjacent to the second cell boundary 316(2). In this manner, the metal lines 304(1)-304(6) are dynamically (i.e., selectively) cut rather than statically cut to achieve particular metrics for the corresponding CMOS standard cell circuit by using the metal lines 304(3), 304(4) in the first metal layer (e.g., M0) to interconnect nodes in CMOS standard cells adjacent to the CMOS standard cell 302. While this aspect includes the uncut edges UC(1), UC(2) corresponding to the metal lines 304(4), 304(3), respectively, other aspects may include uncut edges on any combination of the metal lines 304(1)-304(6), wherein one or more of the metal lines 304(1)-304(6) have an uncut edge on at least one of the first and second cell boundaries 316(1), 316(2).

Figure 4:
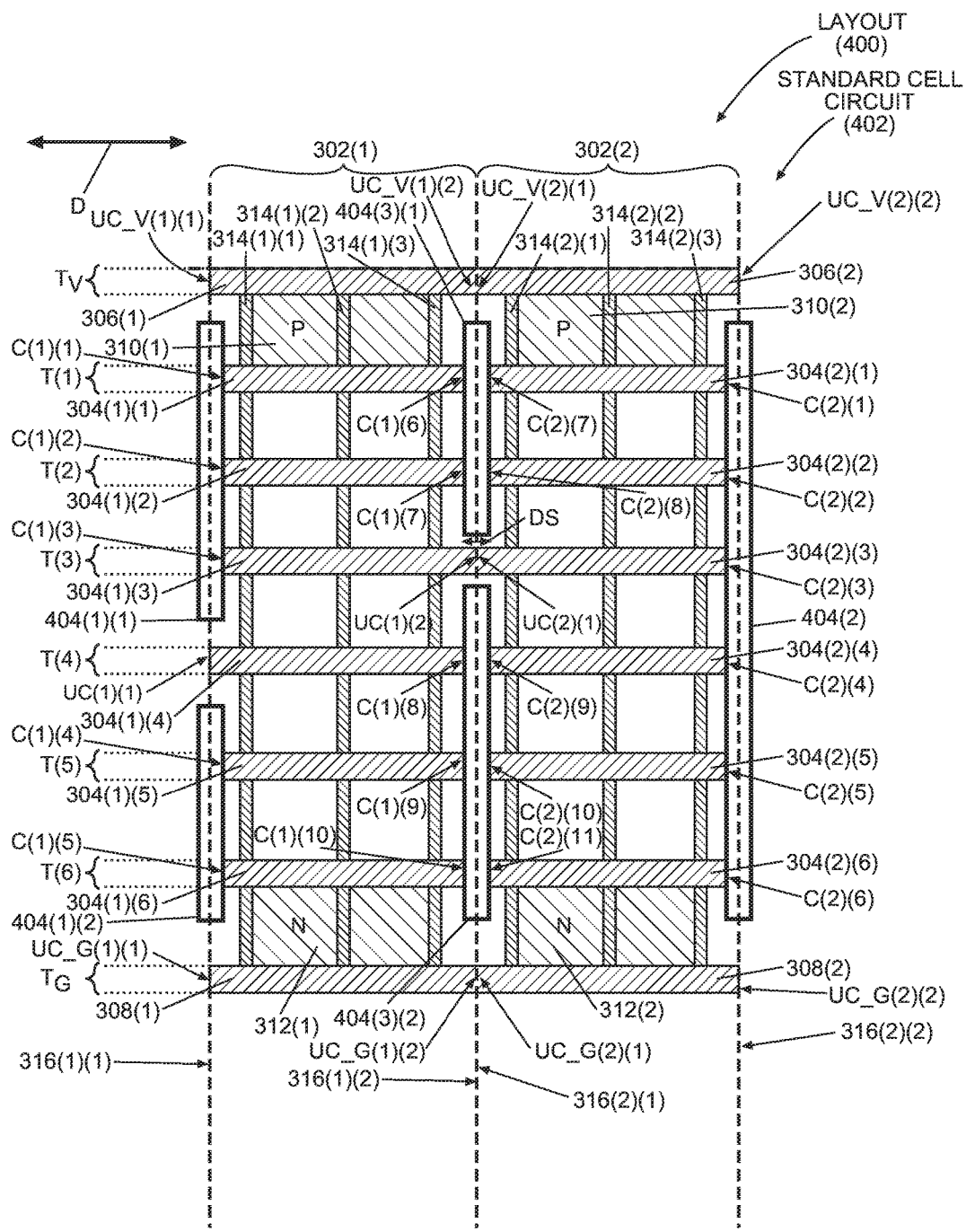
FIG. 4 is a top-view diagram of an exemplary layout of an exemplary CMOS standard cell circuit formed from two (2) instances of the CMOS standard cell of FIG. 3, wherein the metal lines in the first metal layer of each CMOS standard cell have cut edges corresponding to a first cell boundary, a second cell boundary, and/or between the first and second cell boundaries of each CMOS standard cell.

In this regard, FIG. 4 is a top-view diagram of an exemplary layout 400 of an exemplary CMOS standard cell circuit 402 formed using two (2) instances of the CMOS standard cell 302 of FIG. 3, referred to herein as CMOS standard cells 302(1), 302(2). Each CMOS standard cell 302(1), 302(2) includes certain common components with the CMOS standard cell 302 of FIG. 3 as shown by common element numbers between FIGS. 3 and 4, and thus will not be re-described herein.

With continuing reference to FIG. 4, the CMOS standard cell 302(1) includes metal lines 304(1)(1)-304(1)(6), a first supply rail 306(1) (e.g., a voltage rail 306(1)), and a second supply rail 308(1) (e.g., a ground rail 308(1)) disposed in a direction D and in the first metal layer. The CMOS standard cell 302(1) also includes a P region 310(1), an N region 312(1), and gates 314(1)(1)-314(1)(3). Additionally, a first cell boundary 316(1)(1) of the CMOS standard cell 302(1) is on an opposite side of the CMOS standard cell 302(1) compared to a second cell boundary 316(1)(2) of the CMOS standard cell 302(1). Similarly, the CMOS standard cell 302(2) includes metal lines 304(2)(1)-304(2)(6), a first supply rail 306(2) (e.g., a voltage rail 306(2)), and a second supply rail 308(2) (e.g., a ground rail 308(2)) disposed in the direction D and the first metal layer. The CMOS standard cell 302(2) also includes a P region 310(2), an N region 312(2), and gates 314(2)(1)-314(2)(3). Additionally, a first cell boundary 316(2)(1) of the CMOS standard cell 302(2) is on an opposite side of the CMOS standard cell 302(2) compared to a second cell boundary 316(2)(2) of the CMOS standard cell 302(2). The voltage rails 306(1), 306(2) are formed using a single metal line corresponding to the voltage track $T_V$ such that a supply voltage may be shared between the CMOS standard cells 302(1), 302(2). In other words, the voltage rails 306(1), 306(2) are not cut such that the voltage rails 306(1), 306(2) include uncut edges UC_V (1)(1), UC_V(1)(2), UC_V(2)(1), and UC_V(2)(2). The ground rails 308(1), 308(2) are also formed using a single metal line corresponding to the ground track $T_G$ such that a ground voltage may be shared between the CMOS standard cells 302(1), 302(2). In other words, the ground rails 308(1), 308(2) are not cut such that the ground rails 308(1), 308(2) include uncut edges UC_G(1)(1), UC_G(1)(2), UC_G(2)(1), and UC_G(2)(2).

With continuing reference to FIG. 4, each of the corresponding metal lines 304(1)(1)-304(1)(6), 304(2)(1)-304(2)(6) are originally formed using a single metal line corresponding to each track T(1)-T(6). However, a cut mask 404(1)(1) is used to cut the metal lines 304(1)(1)-304(1)(3) corresponding to the first cell boundary 316(1)(1), and a cut mask 404(1)(2) is used to cut metal lines 304(1)(5), 304(1)(6) corresponding to the first cell boundary 316(1)(1). As a result, the CMOS standard cell 302(1) has corresponding cut edges C(1)(1)-C(1)(5) and an uncut edge UC(1)(1) corresponding to the first cell boundary 316(1)(1). A cut mask 404(2) is used to cut the metal lines 304(2)(1)-304(2)(6) corresponding to the second cell boundary 316(2)(2) such that the CMOS standard cell 302(2) has cut edges C(2)(1)-C(2)(6) corresponding to the second cell boundary 316(2)(2). Further, cut masks 404(3)(1), 404(3)(2) are disposed corresponding to the second cell boundary 316(1)(2) of the CMOS standard cell 302(1) and corresponding to the first cell boundary 316(2)(1) of the CMOS standard cell 302(2), wherein the second cell boundary 316(1)(2) is substantially adjacent to the first cell boundary 316(2)(1). Although the cut masks 404(1)(1), 404(1)(2), 404(2), 404(3)(1), 404(3)(2) are each illustrated as a single shape, each cut mask 404(1)(1), 404(1)(2), 404(2), 404(3)(1), 404(3)(2) may be employed using a number of masks according to the type of patterning process used (e.g., single patterning, double patterning, triple patterning, etc.). In this manner, the cut masks 404(3)(1), 404(3)(2) result in the metal lines 304(1)(1), 304(1)(2), 304(1)(4)-304(1)(6) having cut edges C(1)(6)-C(1)(10), and the metal lines 304(2)(1), 304(2)(2), 304(2)(4)-304(2)(6) having cut edges C(2)(7)-C(2)(11). Further, this results in the metal lines 304(1)(1), 304(1)(2), 304(1)(4)-304(1)(6) being separated from the corresponding metal lines 304(2)(1), 304(2)(2), 304(2)(4)-304(2)(6) by a distance DS. However, the cut masks 404(3)(1), 403(3)(2) leave the metal lines 304(1)(3), 304(2)(3) with uncut edges UC(1)(2), UC(2)(1), respectively (i.e., having no corresponding cut edges) such that a single continuous metal line is disposed across the corresponding track T(3) of the CMOS standard cells 302(1), 302(2). In this manner, the single continuous metal line corresponding to the metal lines 304(1)(3), 304(2)(3) can be used to interconnect nodes between the CMOS standard cells 302(1), 302(2).

With continuing reference to FIG. 4, as a non-limiting example, if the first metal layer is M0, then the number of additional metal lines in M1 and M2 and corresponding vias can be reduced, because the interconnections/routing of nodes between the CMOS standard cells 302(1), 302(2) can be achieved using the metal lines 304(1)(3), 304(2)(3) corresponding to the track T(3) in M0. As used herein, M1 and M2 are metal layers disposed above the M0 metal layer. The reduced number of vias and metal lines disposed above the first metal layer reduces the resistance and capacitance of the CMOS standard cells 302(1), 302(2) compared to conventional CMOS standard cells, such as the CMOS standard cell 102 of FIG. 1. Such reduced resistance and capacitance in the CMOS standard cells 302(1), 302(2) results in increased performance and reduced power consumption of the CMOS standard cell circuit 402 compared to the CMOS standard cell circuit 202 of FIG. 2.

Figure 5:
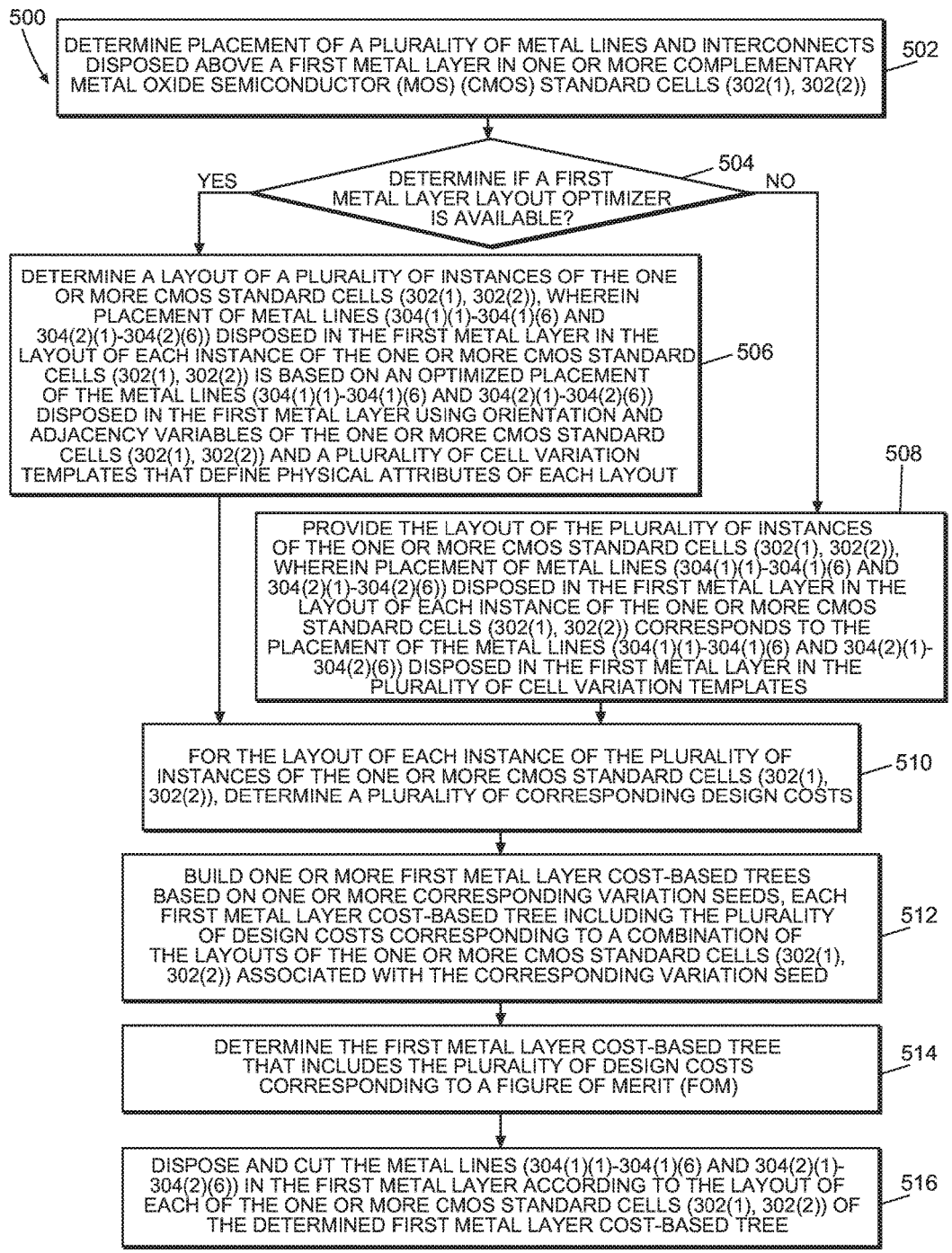
FIG. 5 is a flowchart illustrating an exemplary process for fabricating a CMOS standard cell circuit employing metal lines in the first metal layer used for routing so as to increase performance and reduce power consumption.

FIG. 5 illustrates an exemplary process 500 for fabricating the CMOS standard cell circuit 402 with employing the metal lines 304(1)(1)-304(1)(6) and 304(2)(1)-304(2)(6) in the first metal layer (e.g., M0) used for routing so as to increase performance and reduce power consumption. In particular, the process 500 represents an optimized method for placing and routing metal lines in the first metal layer while also meeting design rules of a corresponding fabrication technology. Additionally, the process 500 as described herein may be employed as a stand-alone pre-processing step prior to using an existing place and route tool, or integrated into an existing place and route tool as an enhancement feature.

In this regard, with continuing reference to FIG. 5, the process 500 includes determining placement of metal lines and interconnects disposed above a first metal layer (e.g., M0) in the CMOS standard cells 302(1), 302(2) (block 502). The process 500 also includes determining if a first metal layer layout optimizer is available (block 504). If the first metal layer layout optimizer is available, the process 500 includes determining a layout of each instance of the CMOS standard cell 302(1), 302(2). More specifically, determining each layout includes placing the metal lines 304(1)(1)-304(1)(6) and 304(2)(1)-304(2)(6) disposed in the first metal layer in the layout of each instance of the CMOS standard cells 302(1), 302(2) based on an optimized placement of the metal lines 304(1)(1)-304(1)(6) and 304(2)(1)-304(2)(6), in conjunction with data from cell variation templates (block 506). For example, the first metal layer layout optimizer may optimize the placement of the metal lines 304(1)(1)-304(1)(6) and 304(2)(1)-304(2)(6) based on adjacency and orientation variables corresponding to the CMOS standard cell 302(1), 302(2). Such adjacency and orientation variables may indicate how the CMOS standard cells 302(1), 302(2) should be oriented with reference to one another in the CMOS standard cell circuit 402. Further, the cell variation templates can include data structures stored in a memory, wherein the cell variation templates describe each possible variation of physical attributes of the first metal layer usage of each instance of each CMOS standard cell 302(1), 302(2). For example, as discussed in more detail below, each cell variation template may include information such as whether particular metal lines 304(1)(1)-304(1)(6) and 304(2)(1)-304(2)(6) may be cut on a corresponding cell boundary, as well as which tracks $T_V$, $T_G$, and $T(1)$-$T(6)$ are available for routing. Further, if the first metal layer layout optimizer is not available, the process 500 includes providing the layout of each instance of the CMOS standard cell 302(1), 302(2), wherein placement of the metal lines 304(1)(1)-304(1)(6) and 304(2)(1)-304(2)(6) disposed in the first metal layer in the layout of each instance of the CMOS standard cell 302(1), 302(2) corresponds to the placement of the metal lines 304(1)(1)-304(1)(6) and 304(2)(1)-304(2)(6) disposed in the first metal layer (M0) in the cell variation templates (block 508).

With continuing reference to FIG. 5, the process 500 further includes for each layout of each instance of the CMOS standard cells 302(1), 302(2), determining corresponding design costs (block 510). For example, block 510 may include determining a power cost, performance cost, and/or area cost of each layout variation based on the first metal layer (M0) usage. Based on the design costs determined in block 510, the process 500 includes building first metal layer cost-based trees based on one or more corresponding variation seeds (block 512). As discussed in more detail below, each first metal layer cost-based tree includes design costs corresponding to a combination of the layouts of the CMOS standard cells 302(1), 302(2) associated with the corresponding variation seed. More specifically, the variation seeds can be defined to control the total number of first metal layer cost-based trees built, wherein each variation seed can correspond to a particular set of permutations of arrangements and physical attributes of the CMOS standard cell circuit 402 (e.g., which metal lines 304(1)(1)-304(1)(6) and 304(2)(1)-304(2)(6) are cut or uncut, the order in which the CMOS standard cells 302(1), 302(2) are disposed/placed, etc.). In particular, multiple first metal layer cost-based trees are built to account for the number of permutations possible for forming the CMOS standard cell circuit 402 using the CMOS standard cells 302(1), 302(2).

With continuing reference to FIG. 5, the process 500 includes determining the first metal layer cost-based tree that includes the design costs corresponding to a figure of merit (FOM) (block 514). For example, the FOM may be determined so as to ensure that the corresponding layout 400 of the CMOS standard cell circuit 402 achieves desired power, performance, and area metrics by maximizing routing on the first metal layer (M0) so as to minimize routing on the additional metal layers. Further, the process 500 includes disposing and cutting the metal lines 304(1)(1)-304(1)(6) and 304(2)(1)-304(2)(6) in the first metal layer (e.g., M0) according to the layout of each of the CMOS standard cells 302(1), 302(2) corresponding to the determined first metal layer cost-based tree (block 516). For example, disposing and cutting the metal lines 304(1)(1)-304(1)(6) and 304(2)(1)-304(2)(6) in block 516 can include disposing the metal lines 304(1)(1)-304(1)(6) and 304(2)(1)-304(2)(6) and using the cut masks 404(1)(1), 404(1)(2), 404(2), 404(3)(1), and 404(3)(2) to form the cut edges C(1)(1)-C(1)(10) and C(2)(1)-C(2)(11), and the uncut edges UC(1)(1), UC(1)(2), and UC(2)(1). Following disposing and cutting the metal lines 304(1)(1)-304(1)(6) and 304(2)(1)-304(2)(6), the process 500 can include disposing interconnects and metal lines above the first metal layer (e.g., disposing metal lines in M1 and M2) according to the layout. In this manner, using the process 500 provides the layout of the CMOS standard cell circuit 402 that achieves the desired FOM by way of optimizing routing in the first metal layer (M0), while reducing the amount of routing in additional metal layers, such as M1 and M2.

Figure 6:
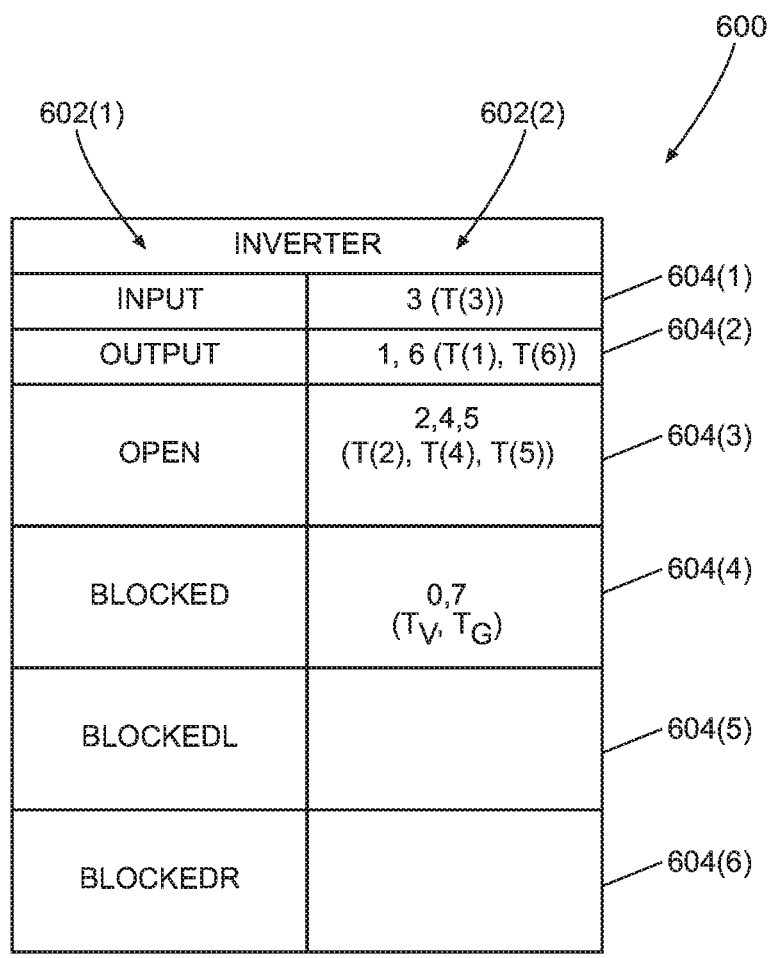
FIG. 6 is a diagram of an exemplary cell variation template employed by the process of FIG. 5.

FIG. 6 illustrates an exemplary cell variation template 600 employed by the process 500 of FIG. 5. In this aspect, the cell variation template 600 corresponds to a CMOS standard cell circuit, such as the CMOS standard cell circuit 402, employed as an inverter and includes columns 602(1), 602(2) divided into rows 604(1)-604(6). The column 602(1) corresponds to particular attributes of the inverter, while column 602(2) includes a reference to tracks $T_V$, $T_G$, and $T(1)$-$T(6)$ within the inverter to which the attribute in the column 602(1) applies. For example, column 602(1), row 604(1) corresponds to an input of the inverter, wherein column 602(2), row 604(1) indicates that the input of the inverter is accessible using a metal line in the first metal layer (M0) corresponding to track 3 (i.e., T(3)). Similarly, column 602(1), row 604(2) corresponds to an output of the inverter, wherein column 602(2), row 604(2) indicates that the output of the inverter is accessible using metal lines in the first metal layer (M0) corresponding to tracks 1 and 6 (i.e., T(1) and T(6)). Additionally, column 602(1), row 604(3) corresponds to open tracks within the inverter, wherein column 602(2), row 604(3) indicates that the metal lines in the first metal layer (M0) corresponding to tracks 2, 4, and 5 (i.e., T(2), T(4), T(5)) are open.

With continuing reference to FIG. 6, column 602(1), row 604(4) defines an attribute indicating that the corresponding track in the first metal layer (M0) cannot be used on either boundary of the inverter, wherein column 602(2), row 604(4) indicates that the tracks 0 and 7 (i.e., $T_V$ and $T_G$) have this attribute. Further, column 602(1), row 604(5) defines an attribute indicating that the corresponding track in the first metal layer (M0) cannot be used on the left boundary of the inverter, wherein column 602(2), row 604(5) indicates that no tracks have this attribute. Column 602(1), row 604(6) defines an attribute indicating that the corresponding track in the first metal layer (M0) cannot be used on the right boundary of the inverter, wherein column 602(2), row 604(6) indicates that no tracks have this attribute. It is important to note that other aspects of the cell variation template 600 may include various attributes in addition to those listed in the cell variation template 600. By using the data provided in cell variation templates, such as the cell variation template 600, the process 500 can compare design costs of various instances of each CMOS standard cell 302(1), 302(2) to determine an optimized usage of the first metal layer (M0).

Figure 7:
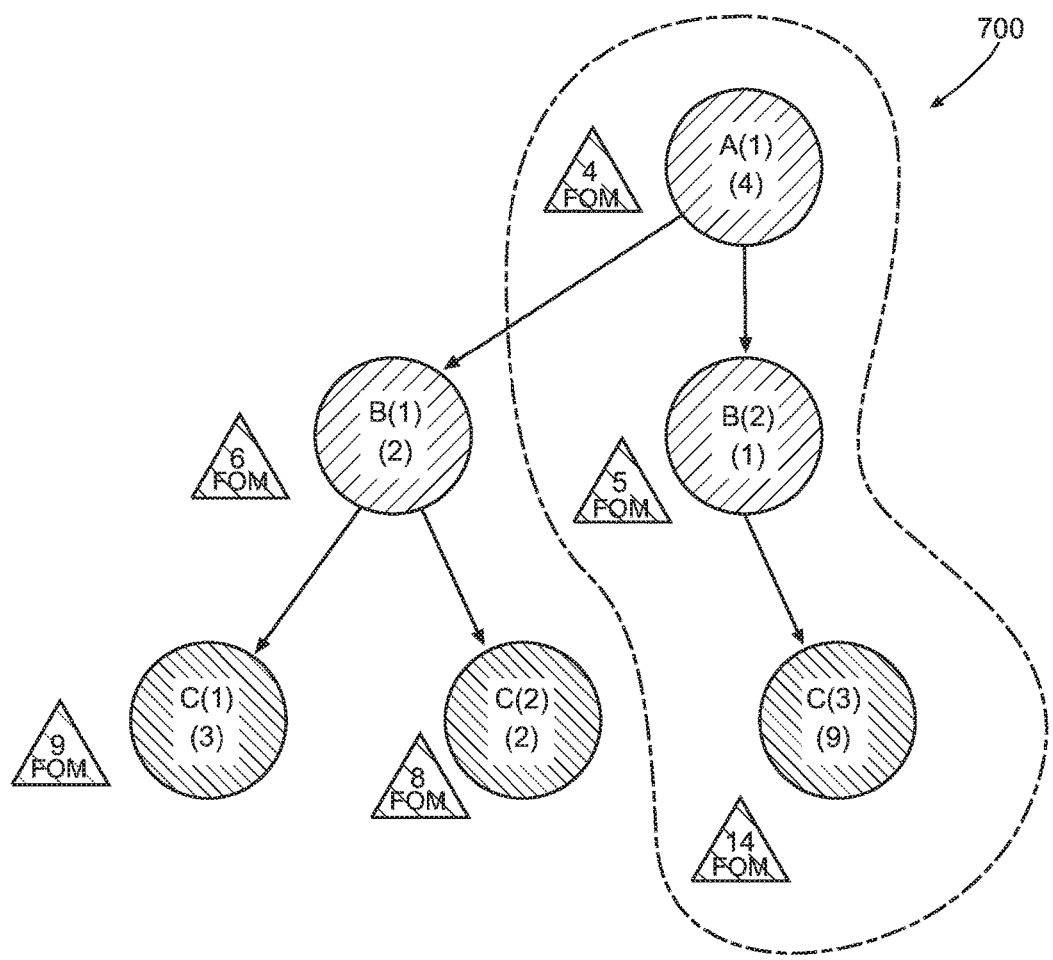
FIG. 7 is a diagram of an exemplary first metal layer cost-based tree generated during the process of FIG. 5.

FIG. 7 is a diagram of an exemplary first metal layer cost-based tree 700 generated during the process 500 of FIG. 5. In this aspect, the first metal layer cost-based tree 700 represents possible combinations of CMOS standard cells A(1), B(1)-B(2), and C(1)-C(3) to form a CMOS standard cell circuit. Further, each instance of each CMOS standard cell A(1), B(1)-B(2), and C(1)-C(3) has a corresponding FOM. For example, the first metal layer cost-based tree 700 has a root node corresponding to the CMOS standard cell A(1) having a FOM of four (4). The CMOS standard cell A(1) can be combined with the CMOS standard cell B(1) having a FOM of two (2). If the CMOS standard cell A(1) is combined with the CMOS standard cell B(1), then the combination can be combined with the CMOS standard cell C(1) having a FOM of three (3) or the CMOS standard cell C(2) having a FOM of two (2). In this manner, the combination of the CMOS standard cells A(1), B(1), and C(1) have a total FOM of nine (9) (i.e., 4+2+3=9), while the combination of the CMOS standard cells A(1), B(1), and C(2) have a total FOM of eight (8) (i.e., 4+2+2=8). Alternatively, the CMOS standard cell A(1) can be combined with the CMOS standard cell B(2) having a FOM of one (1) and the CMOS standard cell C(3) having a FOM of nine (9). In this manner, the combination of the CMOS standard cells A(1), B(2), and C(3) have a total FOM of fourteen (14) (i.e., 4+1+9=14). In this aspect, the FOM is proportional to M0 utilization, and thus, the combination of CMOS standard cells A(1), B(2), and C(3) having the highest FOM of fourteen (14) corresponds to the most desirable design for the CMOS standard cell circuit.

Figure 8A:
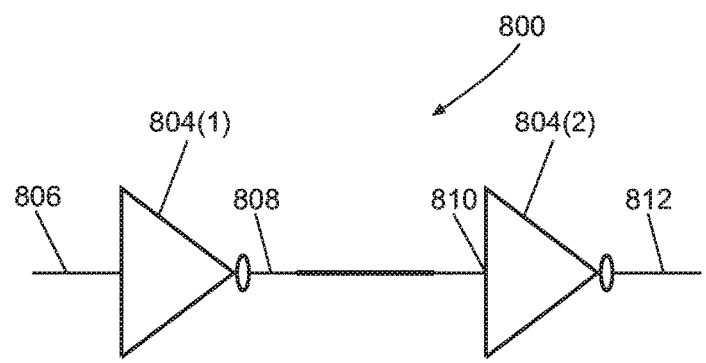
FIG. 8A is a logic diagram of an exemplary buffer.
Figure 8B:
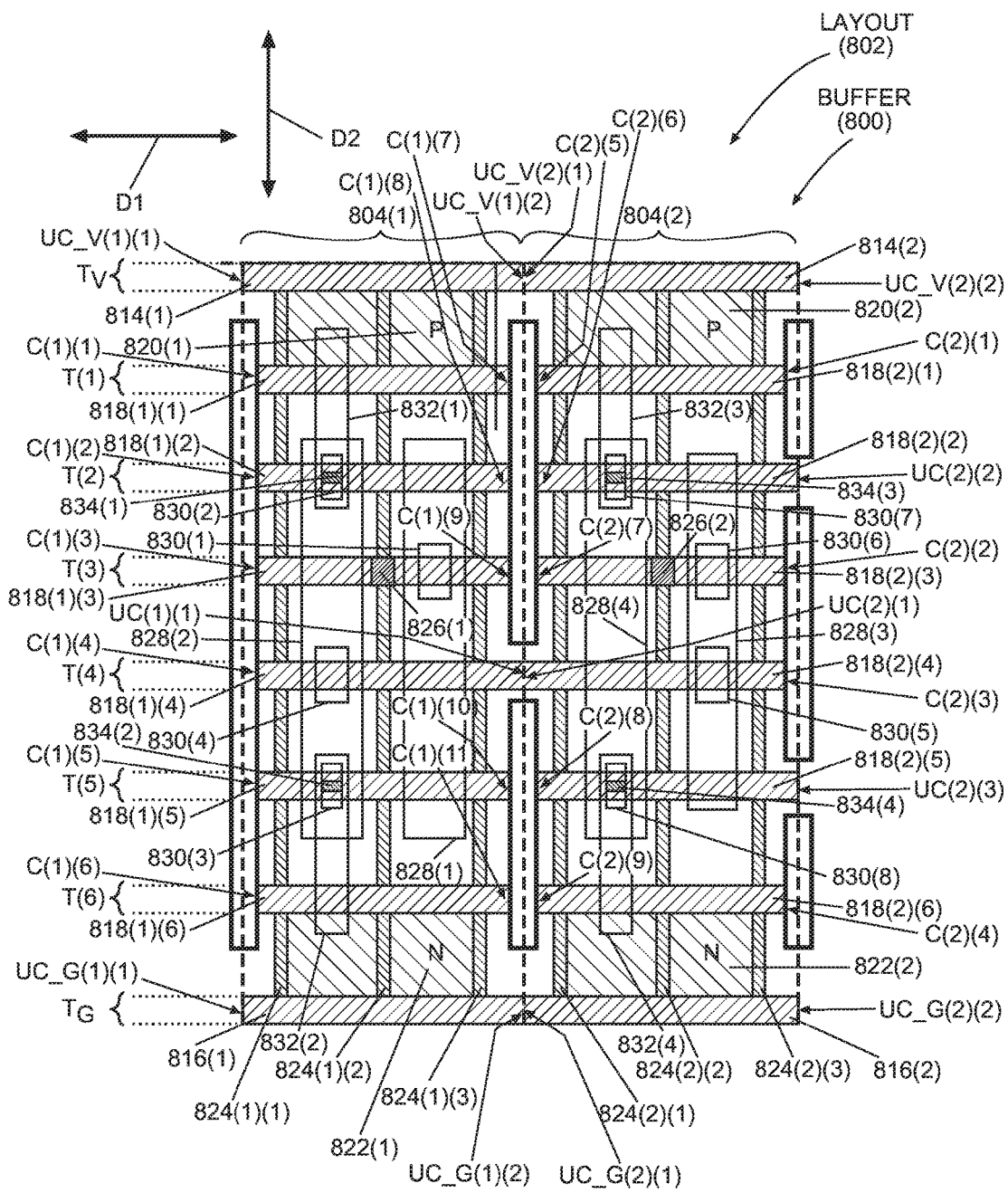
FIG. 8B is a top-view diagram of an exemplary layout of the buffer of FIG. 8A formed using the process of fabrication of FIG. 5.
Figure 8C:
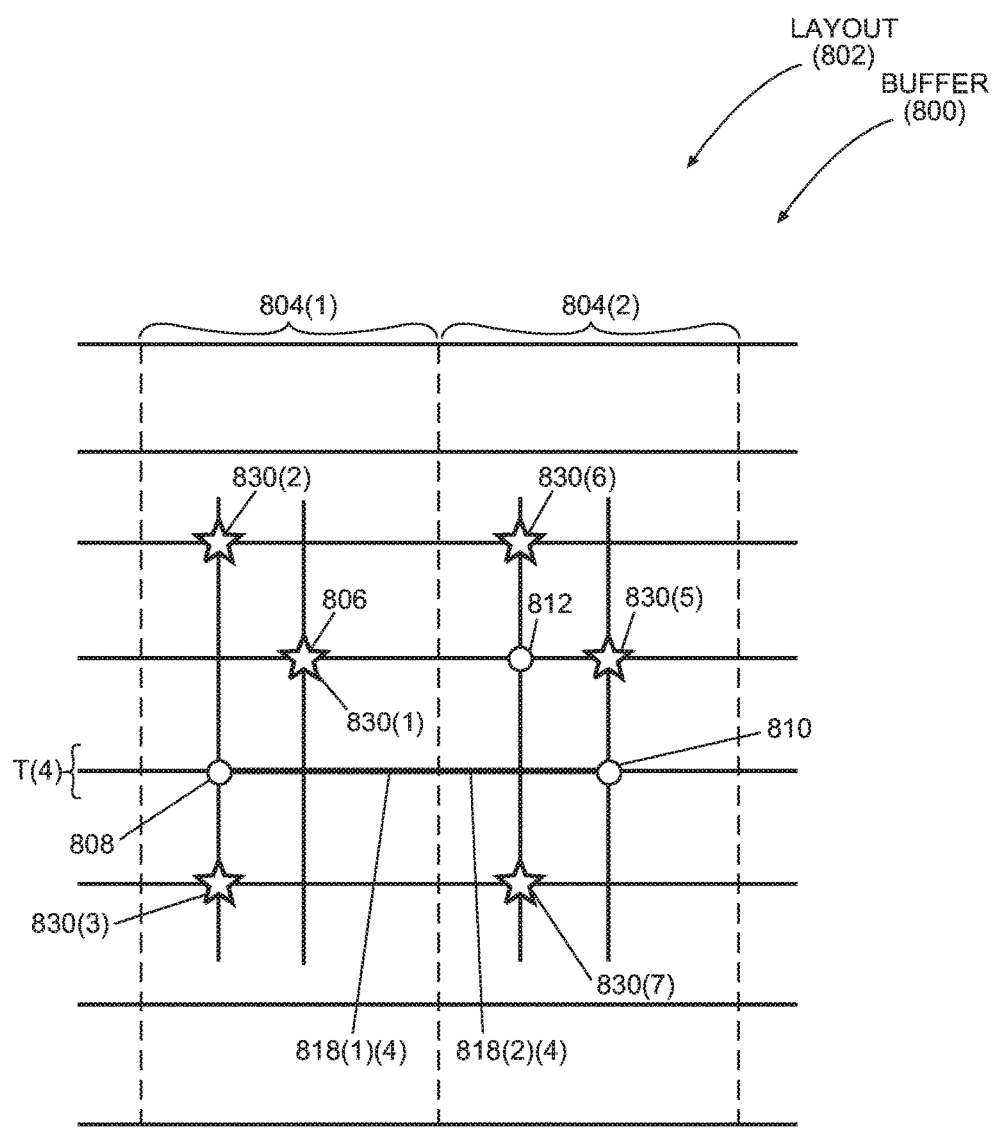
FIG. 8C is an alternative top-view diagram of an exemplary layout of the buffer of FIG. 8A formed using the process of fabrication of FIG. 5.
Figure 8D:
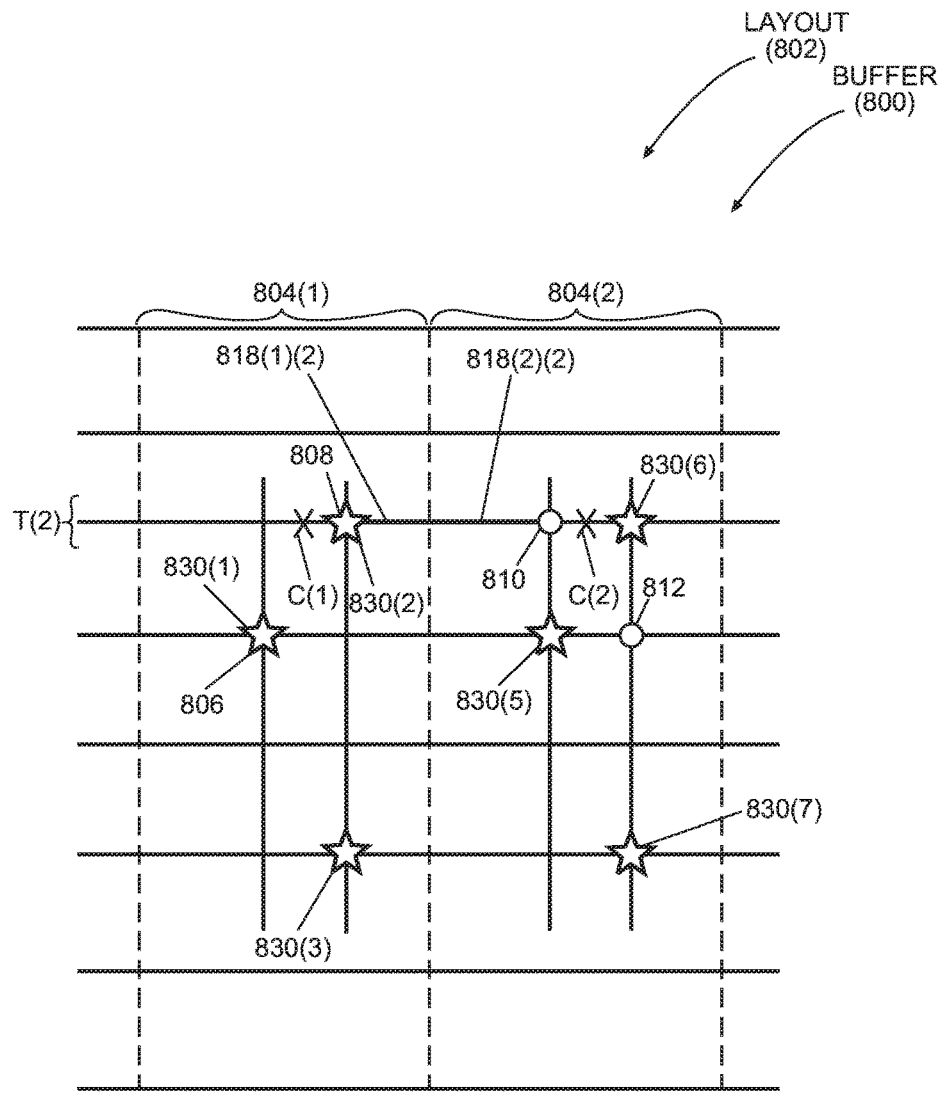
FIG. 8D is another alternative top-view diagram of an exemplary layout of the buffer of FIG. 8A formed using the process of fabrication of FIG. 5.

To provide further clarification of the aspects provided herein, FIGS. 8A-8D illustrate an exemplary buffer 800 that can be fabricated using the process 500 of FIG. 5. FIG. 8A illustrates a logic diagram of the buffer 800, FIG. 8B illustrates a top-view diagram of an exemplary layout 802 of the buffer 800, and FIGS. 8C and 8D illustrate alternative top-view diagrams of the layout 802 of the buffer 800. Components of the buffer 800 are referred to with common element numbers in FIGS. 8A-8D. While FIGS. 8A-8D illustrate the buffer 800, other devices, such as but not limited to, AND-based gates (e.g., NAND gates) and cross-coupled latches may also be fabricated as CMOS standard cell circuits using the process 500 of FIG. 5.

With continuing reference to FIGS. 8A-8D, the buffer 800 includes inverters 804(1), 804(2). In particular, the inverter 804(1) has an input node 806 and an output node 808, and the inverter 804(2) has an input node 810 and an output node 812. The output node 808 of the inverter 804(1) is electrically coupled to the input node 810 of the inverter 804(2). With particular reference to FIG. 8B, the inverter 804(1) includes a first supply rail 814(1) (e.g., a voltage rail 814(1)) corresponding to a voltage track $T_V$ and having uncut edges UC_V(1)(1), UC_V(1)(2), wherein the voltage rail 814(1) is disposed in a first direction D1 in a first metal layer (e.g., M0). The inverter 804(1) also includes a second supply rail 816(1) (e.g., a ground rail 816(1)) corresponding to a ground track $T_G$ and having uncut edges UC_G(1)(1), UC_G(1)(2), wherein the ground rail 816(1) is disposed in the first direction D1 in the first metal layer (M0). The inverter 804(1) also includes metal lines 818(1)(1)-818(1)(6) corresponding to tracks T(1)-T(6) disposed in the first direction D1 and in the first metal layer (M0), cut edges C(1)(1)-C(1)(11), uncut edge UC(1)(1), a P region 820(1), an N region 822(1), and gates 824(1)(1)-824(1)(3). Further, the inverter 804(2) includes a first supply rail 814(2) (e.g., a voltage rail 814(2)) corresponding to the voltage track $T_V$ and having uncut edges UC_V(2)(1), UC_V(2)(2), wherein the voltage rail 814(2) is disposed in the first direction D1 in the first metal layer (M0). The inverter 804(2) also includes and a second supply rail 816(2) (e.g., a ground rail 816(2)) corresponding to the ground track $T_G$ and having uncut edges UC_G(2)(1), UC_G(2)(2), wherein the ground rail 816(2) is disposed in the first direction D1 and the first metal layer (M0). The inverter 804(2) includes metal lines 818(2)(1)-818(2)(6) corresponding to tracks T(1)-T(6) disposed in the first direction D1 and in the first metal layer (M0), cut edges C(2)(1)-C(2)(9), uncut edges UC(2)(1)-UC(2)(3), a P region 820(2), an N region 822(2), and gates 824(2)(1)-824(2)(3). In this manner, the voltage rails 814(1), 814(2) are formed using a single metal line corresponding to the voltage track $T_V$, and the ground rails 816(1), 816(2) are formed using a single metal line corresponding to the ground track $T_G$.

With continuing reference to FIG. 8B, an input is provided to the gate 824(1)(2) (i.e., the input node 806), which is electrically coupled to the metal line 818(1)(3) by way of a via 826(1) (e.g., M0 via 826(1)). The metal line 818(1)(3) is electrically coupled to a metal line 828(1) disposed in a second metal layer (e.g., M1) and in a second direction D2 orthogonal to the first direction D1 by way of a via 830(1) (e.g., zero level via V0 830(1)). The P region 820(1) is electrically coupled to the metal line 818(1)(2) by way of a metal-to-diffusion (MD) line 832(1) and via 834(1) (e.g., M0 via 834(1)). Similarly, the N region 822(1) is electrically coupled to the metal line 818(1)(5) by way of an MD line 832(2) and via 834(2) (e.g., M0 via 834(2)). Further, the metal lines 818(1)(2), 818(1)(5) are electrically coupled to a metal line 828(2) disposed in the second metal layer (M1) using respective vias 830(2), 830(3) (e.g., zero level vias V0 830(2), 830(3)). The metal line 828(2) is electrically coupled to the metal line 818(1)(4) using a via 830(4) (e.g., zero level via V0 830(4)) to form the output node 808.

With continuing reference to FIG. 8B, rather than routing the output node 808 to the input node 810 using additional metal layers such as M2, the buffer 800 is formed such that no cut is made corresponding to the track T(4) such that the metal lines 818(1)(4), 818(2)(4) form a single continuous metal line across the track T(4) of the inverters 804(1), 804(2). In this manner, the output node 808 is interconnected to the input node 810 using the first metal layer (M0). In particular, the single metal line corresponding to metal lines 818(1)(4), 818(2)(4) electrically couples to a metal line 828(3) disposed in the second metal layer (e.g., M1) by way of a via 830(5) (e.g., zero level via V0 830(5)). A via 830(6) (e.g., zero level via V0 830(6)) electrically couples the metal line 828(3) to the metal line 818(2)(3), wherein the metal line 818(2)(3) is electrically coupled to the gate 824(2)(2) by way of a via 826(2) (e.g., M0 via 826(2)). The P region 820(2) is electrically coupled to the metal line 818(2)(2) by way of an MD line 832(3) and via 834(3) (e.g., M0 via 834(3)). Similarly, the N region 822(2) is electrically coupled to the metal line 818(2)(5) by way of an MD line 832(4) and via 834(4) (e.g., M0 via 834(4)). Further, the metal lines 818(2)(2), 818(2)(5) are electrically coupled to a metal line 828(4) disposed in the second metal layer (M1) using respective vias 830(7), 830(8) (e.g., V0 830(7), 830 (8)).

In this manner, with continuing reference to FIG. 8B, the output node 808 is electrically coupled to the input node 810 using the metal lines 818(1)(4), 818(2)(4) corresponding to the track T(4) in M0, thus avoiding additional vias and metal lines in additional metal layers, such as M2. The reduced number of vias and metal lines disposed above the first metal layer reduces the resistance and capacitance of the buffer 800 compared to conventional buffers, resulting in increased performance and reduced power consumption of the buffer 800. Additionally, other aspects of the buffer 800 may achieve reduced area consumption by configuring the process 500 to combine particular elements, such as floating gates. For example, the process 500 may be configured to combine the gates 824(1)(3), 824(2)(1) into a single floating gate such that the overall width of the buffer 800 is decreased, thus reducing area consumption.

With particular reference to FIG. 8C, the alternative top-view diagram illustrates the output node 808 interconnected to the input node 810 using a single metal line represented by the metal lines 818(1)(4), 818(2)(4) corresponding to the track T(4). The orientation of the inverters 804(1), 804(2) illustrated in FIG. 8C may be based on the FOM determinations in the process 500 of FIG. 5 above. However, the buffer 800 may be designed with an alternative orientation of the inverters 804(1), 804(2) to achieve a different FOM. For example, FIG. 8D illustrates another alternative top-view diagram of the layout 802 of the buffer 800. In particular, FIG. 8D includes the inverters 804(1), 804(2) oriented as a mirror image compared to the inverters 804(1), 804(2) in FIG. 8C. In this manner, rather than interconnecting the output node 808 to the input node 810 using the single metal line represented by the metal lines 818(1)(4), 818(2)(4) corresponding to the track T(4), the orientation in FIG. 8D results in the output node 808 interconnecting to the input node 810 by way of the single metal line represented by the metal lines 818(1)(2), 818(2)(2) corresponding to track T(2). It is worth noting that the metal line 818(1)(2) has a cut edge C(1) and metal line 818(2)(2) has a cut edge C(2) in this aspect such that the single metal line corresponding to track T(2) is limited to electrically coupling the output node 808 and the input node 810.

Figure 9:
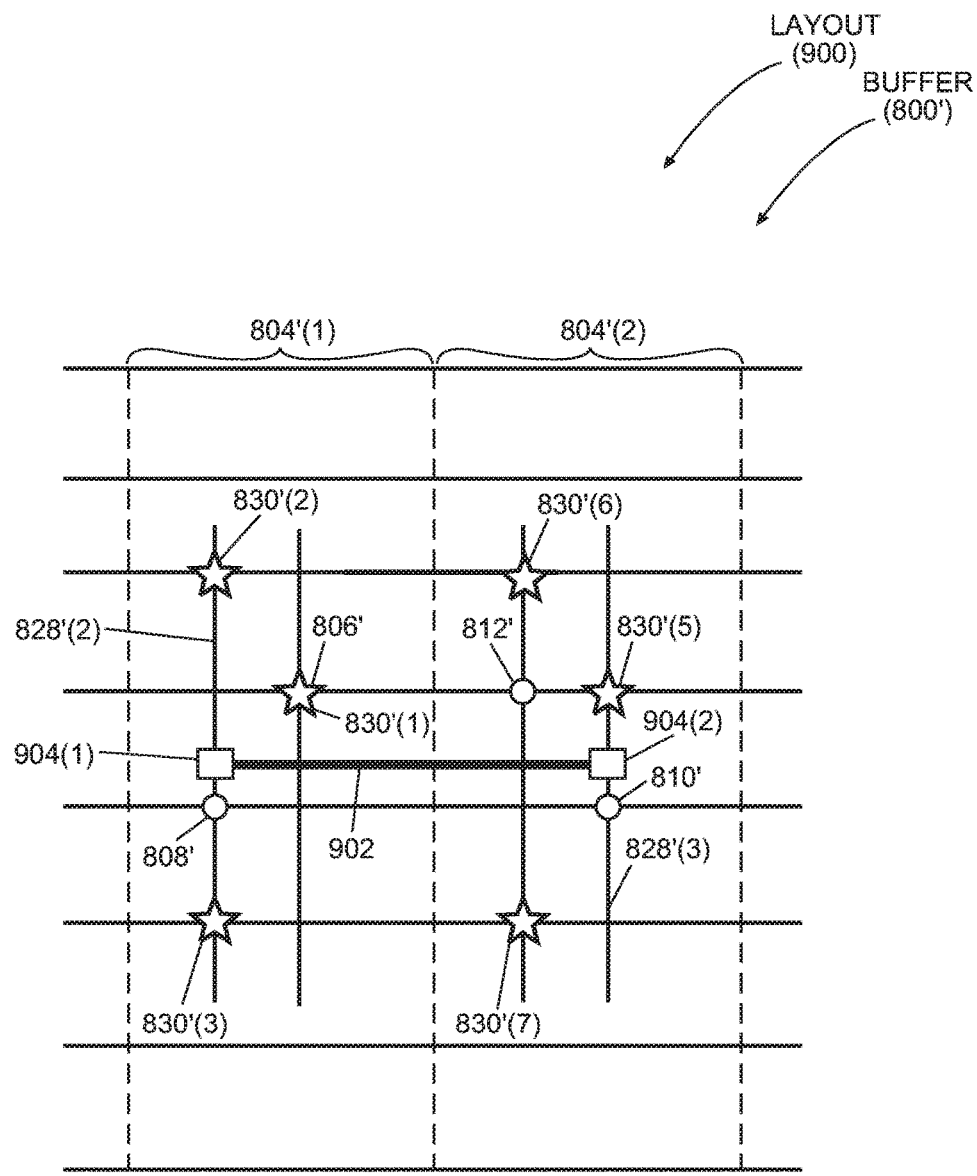
FIG. 9 is an alternative top-view diagram of an exemplary layout of the buffer of FIG. 8A formed using a conventional fabrication process that does not dynamically cut metal lines in a first metal layer.

As a point of comparison, FIG. 9 illustrates an alternative top-view diagram of a layout 900 of a buffer 800' similar to the buffer 800 of FIG. 8A formed using a conventional fabrication process that does not dynamically cut metal lines in a first metal layer. As illustrated in FIG. 9, if the first metal layer (e.g., M0) cannot be used to interconnect the output node 808' of the inverter 804'(1) to the input node 810' of the inverter 804'(2), a metal line 902 in an additional metal layer (e.g., M2) is used to make the interconnection. However, in additional to employing the metal line 902, associated vias 904(1), 904(2) (e.g., M1 vias 904(1), 904(2)) are employed to electrically couple the metal line 902 and the metal lines 828'(2), 828'(3), respectively. The metal line 902 and the vias 904(1), 904(2) increase the resistance and the capacitance of the buffer 800' compared to the layout 802 in FIGS. 8B-8D, resulting in higher power consumption and reduced performance for the buffer 800'.

CMOS standard cell circuits employing metal lines in a first metal layer used for routing, and related methods, according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 10:
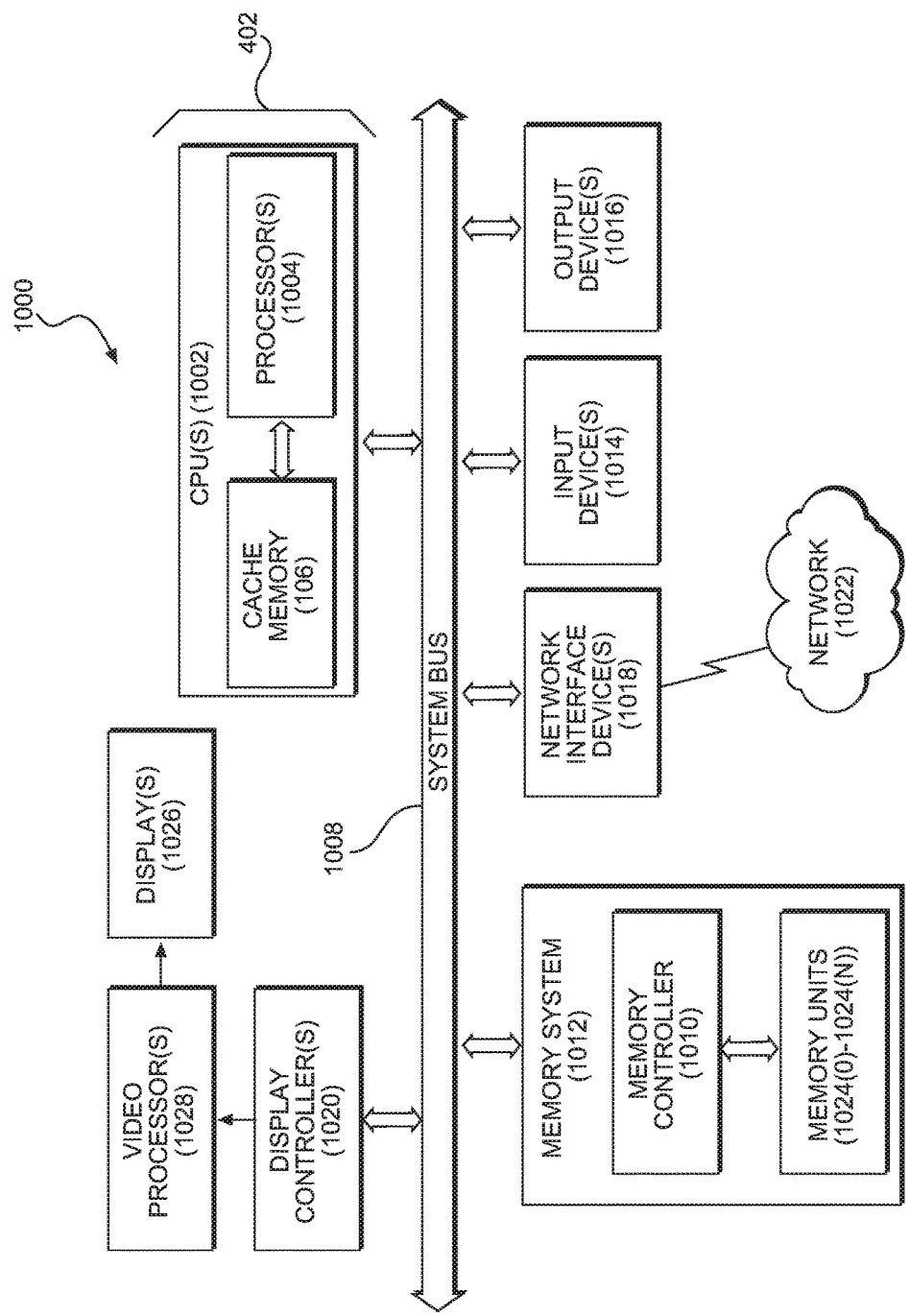
FIG. 10 is a block diagram of an exemplary processor-based system that can include elements employing the CMOS standard cell circuit of FIG. 4 employing metal lines in a first metal layer used for routing so as to increase performance and reduce power consumption.

In this regard, FIG. 10 illustrates an example of a processor-based system 1000 that can include elements employing the CMOS standard cell circuit 402 of FIG. 4 employing metal lines in the first metal layer used for routing so as to increase performance and reduce power consumption. In this example, the processor-based system 1000 includes one or more central processing units (CPUs) 1002, each including one or more processors 1004. The CPU(s) 1002 may have cache memory 1006 coupled to the processor(s) 1004 for rapid access to temporarily stored data. The CPU(s) 1002 is coupled to a system bus 1008 and can intercouple master and slave devices included in the processor-based system 1000. As is well known, the CPU(s) 1002 communicates with these other devices by exchanging address, control, and data information over the system bus 1008. For example, the CPU(s) 1002 can communicate bus transaction requests to a memory controller 1010 as an example of a slave device. Although not illustrated in FIG. 10, multiple system buses 1008 could be provided, wherein each system bus 1008 constitutes a different fabric.

Other master and slave devices can be connected to the system bus 1008. As illustrated in FIG. 10, these devices can include a memory system 1012, one or more input devices 1014, one or more output devices 1016, one or more network interface devices 1018, and one or more display controllers 1020, as examples. The input device(s) 1014 can include any type of input device, including, but not limited to, input keys, switches, voice processors, etc. The output device(s) 1016 can include any type of output device, including, but not limited to, audio, video, other visual indicators, etc. The network interface device(s) 1018 can be any device configured to allow exchange of data to and from a network 1022. The network 1022 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 1018 can be configured to support any type of communications protocol desired. The memory system 1012 can include one or more memory units 1024 (0)-1024(N).

The CPU(s) 1002 may also be configured to access the display controller(s) 1020 over the system bus 1008 to control information sent to one or more displays 1026. The display controller(s) 1020 sends information to the display(s) 1026 to be displayed via one or more video processors 1028, which process the information to be displayed into a format suitable for the display(s) 1026. The display(s) 1026 can include any type of display, including, but not limited to, a cathode ray tube (CRT), a liquid crystal display (LCD), a plasma display, a light emitting diode (LED) display, etc.

Figure 11:
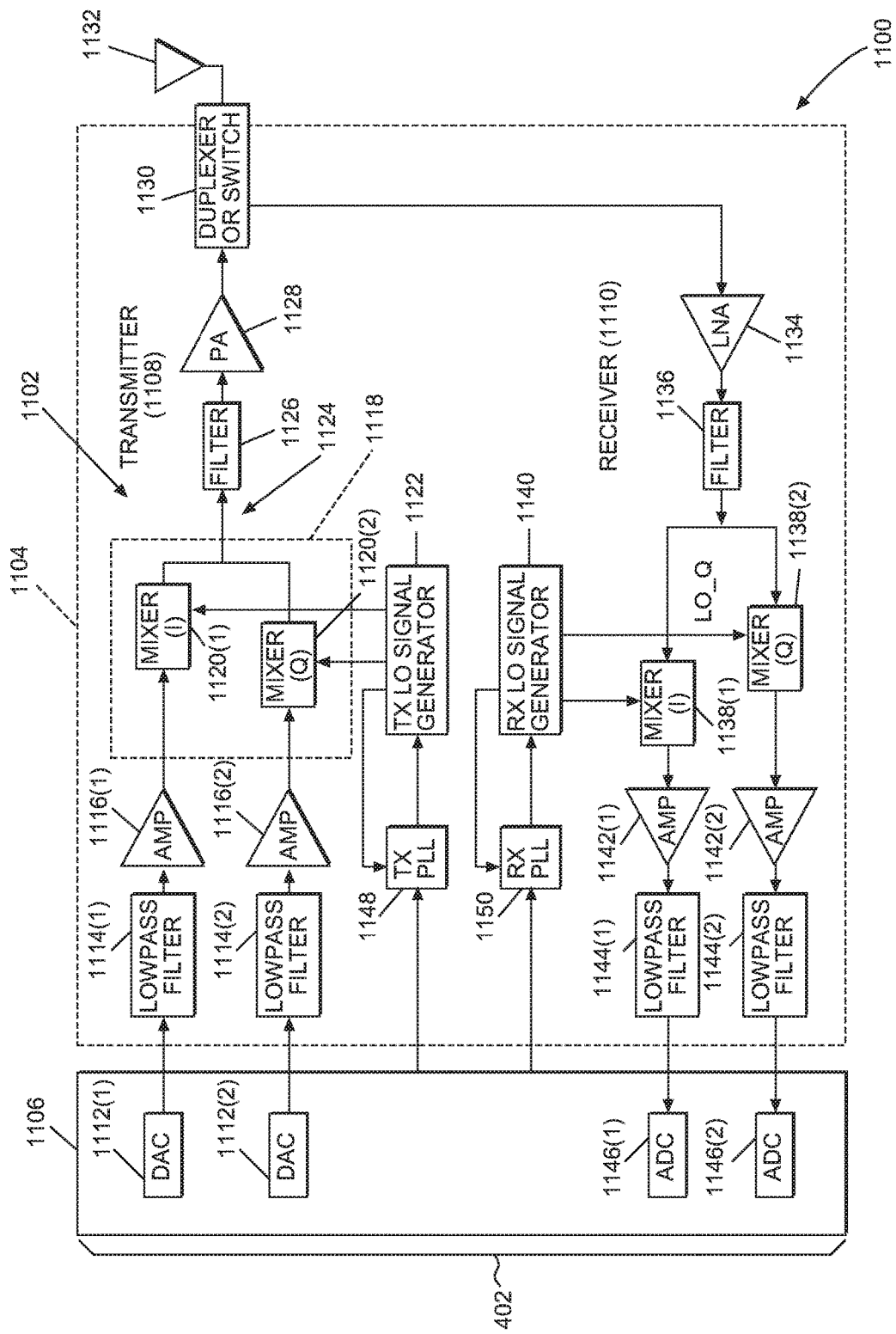
FIG. 11 is a block diagram of an exemplary wireless communications device that includes radio frequency (RF) components formed in an integrated circuit (IC), wherein the RF components can include elements employing the CMOS standard cell circuit of FIG. 4 employing metal lines in a first metal layer used for routing so as to increase performance and reduce power consumption.

FIG. 11 illustrates an exemplary wireless communications device 1100 that includes radio frequency (RF) components formed in an integrated circuit (IC) 1102, wherein the RF components can include elements employing the CMOS standard cell circuit 402 of FIG. 4 employing metal lines in the first metal layer used for routing so as to increase performance and reduce power consumption. In this regard, the wireless communications device 1100 may be provided in the IC 1102. The wireless communications device 1100 may include or be provided in any of the above referenced devices, as examples. As shown in FIG. 11, the wireless communications device 1100 includes a transceiver 1104 and a data processor 1106. The data processor 1106 may include a memory to store data and program codes. The transceiver 1104 includes a transmitter 1108 and a receiver 1110 that support bi-directional communication. In general, the wireless communications device 1100 may include any number of transmitters and/or receivers for any number of communication systems and frequency bands. All or a portion of the transceiver 1104 may be implemented on one or more analog ICs, RF ICs (RFICs), mixed-signal ICs, etc.

A transmitter or a receiver may be implemented with a super-heterodyne architecture or a direct-conversion architecture. In the super-heterodyne architecture, a signal is frequency-converted between RF and baseband in multiple stages, e.g., from RF to an intermediate frequency (IF) in one stage, and then from IF to baseband in another stage for a receiver. In the direct-conversion architecture, a signal is frequency-converted between RF and baseband in one stage. The super-heterodyne and direct-conversion architectures may use different circuit blocks and/or have different requirements. In the wireless communications device 1100 in FIG. 11, the transmitter 1108 and the receiver 1110 are implemented with the direct-conversion architecture.

In the transmit path, the data processor 1106 processes data to be transmitted and provides I and Q analog output signals to the transmitter 1108. In the exemplary wireless communications device 1100, the data processor 1106 includes digital-to-analog-converters (DACs) 1112(1), 1112(2) for converting digital signals generated by the data processor 1106 into the I and Q analog output signals, e.g., I and Q output currents, for further processing.

Within the transmitter 1108, lowpass filters 1114(1), 1114(2) filter the I and Q analog output signals, respectively, to remove undesired signals caused by the prior digital-to-analog conversion. Amplifiers (AMP) 1116(1), 1116(2) amplify the signals from the lowpass filters 1114(1), 1114(2), respectively, and provide I and Q baseband signals. An upconverter 1118 upconverts the I and Q baseband signals with I and Q transmit (TX) local oscillator (LO) signals through mixers 1120(1), 1120(2) from a TX LO signal generator 1122 to provide an upconverted signal 1124. A filter 1126 filters the upconverted signal 1124 to remove undesired signals caused by the frequency upconversion as well as noise in a receive frequency band. A power amplifier (PA) 1128 amplifies the upconverted signal 1124 from the filter 1126 to obtain the desired output power level and provides a transmit RF signal. The transmit RF signal is routed through a duplexer or switch 1130 and transmitted via an antenna 1132.

In the receive path, the antenna 1132 receives signals transmitted by base stations and provides a received RF signal, which is routed through the duplexer or switch 1130 and provided to a low noise amplifier (LNA) 1134. The duplexer or switch 1130 is designed to operate with a specific receive (RX)-to-TX duplexer frequency separation, such that RX signals are isolated from TX signals. The received RF signal is amplified by the LNA 1134 and filtered by a filter 1136 to obtain a desired RF input signal. Down-conversion mixers 1138(1), 1138(2) mix the output of the filter 1136 with I and Q RX LO signals (i.e., LO_I and LO_Q) from an RX LO signal generator 1140 to generate I and Q baseband signals. The I and Q baseband signals are amplified by amplifiers (AMP) 1142(1), 1142(2) and further filtered by lowpass filters 1144(1), 1144(2) to obtain I and Q analog input signals, which are provided to the data processor 1106. In this example, the data processor 1106 includes analog-to-digital-converters (ADCs) 1146(1), 1146(2) for converting the analog input signals into digital signals to be further processed by the data processor 1106.

In the wireless communications device 1100 of FIG. 11, the TX LO signal generator 1122 generates the I and Q TX LO signals used for frequency upconversion, while the RX LO signal generator 1140 generates the I and Q RX LO signals used for frequency downconversion. Each LO signal is a periodic signal with a particular fundamental frequency. A TX phase-locked loop (PLL) circuit 1148 receives timing information from the data processor 1106 and generates a control signal used to adjust the frequency and/or phase of the TX LO signals from the TX LO signal generator 1122. Similarly, an RX phase-locked loop (PLL) circuit 1150 receives timing information from the data processor 1106 and generates a control signal used to adjust the frequency and/or phase of the RX LO signals from the RX LO signal generator 1140.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. As a non-limiting example, aspects disclosed herein may include a non-transitory computer-readable medium having stored thereon computer data which, when used by a fabrication system, allows the fabrication system to fabricate a CMOS standard cell circuit such as the CMOS standard cell circuit 402 in FIG. 4. The master and slave devices described herein may be employed in any circuit, hardware component, IC, or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A complementary metal oxide semiconductor (MOS) (CMOS) standard cell, comprising:
a first supply rail disposed in a direction in a first metal layer;
a second supply rail disposed in the direction in the first metal layer; and
a plurality of metal lines disposed in the direction in the first metal layer, wherein:
each metal line of the plurality of metal lines corresponds to a track of a plurality of tracks;
one or more metal lines of the plurality of metal lines have a cut edge corresponding to a first cell boundary of the CMOS standard cell;
one or more metal lines of the plurality of metal lines have a cut edge corresponding to a second cell boundary of the CMOS standard cell, wherein the second cell boundary is on an opposite side of the CMOS standard cell compared to the first cell boundary; and
one or more metal lines of the plurality of metal lines have an uncut edge corresponding to at least one of the first cell boundary and the second cell boundary.

2. The CMOS standard cell of claim 1, further comprising one or more metal lines disposed in a second metal layer and in a second direction that is substantially orthogonal to the direction.

3. The CMOS standard cell of claim 2, further comprising one or more vertical interconnect accesses (vias) disposed between the first metal layer and the second metal layer, wherein the one or more vias electrically couple one or more metal lines in the second metal layer and one or more metal lines in the first metal layer.

4. The CMOS standard cell of claim 3, wherein:
the first metal layer comprises a metal zero layer (M0);
the second metal layer comprises a metal one layer (M1) disposed above the first metal layer; and
the one or more vias comprise one or more zero level vias (V0).

5. The CMOS standard cell of claim 1, wherein the plurality of metal lines in the first metal layer are disposed between the first supply rail and the second supply rail.

6. The CMOS standard cell of claim 1, wherein:
the first supply rail is disposed between one or more metal lines of the plurality of metal lines in the first metal layer; and
the second supply rail is disposed between one or more metal lines of the plurality of metal lines in the first metal layer.

7. The CMOS standard cell of claim 1 integrated into an integrated circuit (IC).

8. The CMOS standard cell of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

9. A complementary metal oxide semiconductor (MOS) (CMOS) standard cell circuit, comprising:
a plurality of CMOS standard cells, each CMOS standard cell comprising:
a first supply rail disposed in a direction in a first metal layer;
a second supply rail disposed in the direction in the first metal layer; and
a plurality of metal lines disposed in the direction in the first metal layer, wherein:
each metal line of the plurality of metal lines corresponds to a track of a plurality of tracks;
one or more metal lines of the plurality of metal lines have a cut edge corresponding to a first cell boundary of a corresponding CMOS standard cell;
one or more metal lines of the plurality of metal lines have a cut edge corresponding to a second cell boundary of the corresponding CMOS standard cell, wherein the second cell boundary is on an opposite side of the corresponding CMOS standard cell compared to the first cell boundary; and one or more metal lines of the plurality of metal lines have an uncut edge corresponding to at least one of the first cell boundary and the second cell boundary;

wherein:
one or more CMOS standard cells of the plurality of CMOS standard cells are disposed such that the second cell boundary of the one or more CMOS standard cells is substantially adjacent to a first cell boundary of one or more other CMOS standard cells; and one or more metal lines of two or more CMOS standard cells form a single continuous metal line across corresponding tracks of the two or more CMOS standard cells.

10. The CMOS standard cell circuit of claim 9, wherein one or more CMOS standard cells of the plurality of CMOS standard cells further comprise one or more metal lines disposed in a second metal layer and in a second direction that is substantially orthogonal to the direction.

11. The CMOS standard cell circuit of claim 10, wherein one or more CMOS standard cells of the plurality of CMOS standard cells further comprise one or more vertical interconnect accesses (vias) disposed between the first metal layer and the second metal layer, wherein the one or more vias electrically couple one or more metal lines in the second metal layer and one or more metal lines in the first metal layer.

12. The CMOS standard cell circuit of claim 11, wherein:
the first metal layer comprises a metal zero layer (M0);
the second metal layer comprises a metal one layer (M1) disposed above the first metal layer; and
the one or more vias comprise one or more zero level vias (V0).

13. The CMOS standard cell circuit of claim 9, wherein the plurality of metal lines in the first metal layer of each CMOS standard cell are disposed between the first supply rail and the second supply rail.

14. The CMOS standard cell circuit of claim 9, wherein:
the first supply rail of each CMOS standard cell is disposed between one or more metal lines of the plurality of metal lines in the first metal layer; and
the second supply rail of each CMOS standard cell is disposed between one or more metal lines of the plurality of metal lines in the first metal layer.

15. The CMOS standard cell circuit of claim 9, wherein the plurality of CMOS standard cells is arranged to form a buffer.

16. A method for fabricating a CMOS standard cell circuit with dynamically cut metal lines in a first metal layer, comprising:
determining placement of a plurality of metal lines and interconnects disposed above a first metal layer in one or more CMOS standard cells;
determining if a first metal layer layout optimizer is available;

responsive to determining that the first metal layer layout optimizer is available, determining a layout of a plurality of instances of the one or more CMOS standard cells, wherein placement of the plurality of metal lines disposed in the first metal layer in the layout of each instance of the one or more CMOS standard cells is based on an optimized placement of the plurality of metal lines disposed in the first metal layer using orientation and adjacency variables of the one or more CMOS standard cells and a plurality of cell variation templates that define physical attributes of each layout;
responsive to determining that the first metal layer layout optimizer is not available, providing the layout of the plurality of instances of the one or more CMOS standard cells, wherein placement of the plurality of metal lines disposed in the first metal layer in the layout of each instance of the one or more CMOS standard cells corresponds to the placement of the plurality of metal lines disposed in the first metal layer in the plurality of cell variation templates;
for each layout of each instance of the plurality of instances of the one or more CMOS standard cells, determining a plurality of corresponding design costs;
building one or more first metal layer cost-based trees based on one or more corresponding variation seeds, each first metal layer cost-based tree comprising the plurality of design costs corresponding to a combination of the layouts of the one or more CMOS standard cells associated with the corresponding variation seed;
determining the first metal layer cost-based tree that includes the plurality of design costs corresponding to a figure of merit; and
disposing and cutting the plurality of metal lines in the first metal layer according to the layout of each of the one or more CMOS standard cells of the determined first metal layer cost-based tree.

17. The method of claim 16, wherein determining the plurality of corresponding design costs comprises, for each instance of the plurality of instances of the one or more CMOS standard cells, determining a corresponding power cost, performance cost, and area cost.

18. The method of claim 16, further comprising disposing the interconnects and the plurality of metal lines above the first metal layer according to the layout.

19. The method of claim 16, wherein disposing and cutting the plurality of metal lines in the first metal layer comprises:
disposing the plurality of metal lines in the first metal layer; and
cutting one or more metal lines of the plurality of metal lines corresponding to a first cell boundary of a corresponding CMOS standard cell, a second cell boundary of the corresponding CMOS standard cell, and between the first cell boundary and the second cell boundary of the corresponding CMOS standard cell.

20. The method of claim 16, wherein disposing and cutting the plurality of metal lines comprises disposing and cutting the plurality of metal lines in a metal zero (M0) layer.

* * * * *